(12) United States Patent
Holtcamp et al.

(10) Patent No.: US 8,604,148 B2
(45) Date of Patent: Dec. 10, 2013

(54) FUNCTIONALIZATION OF VINYL TERMINATED POLYMERS BY RING OPENING CROSS METATHESIS

(75) Inventors: Matthew W. Holtcamp, Huffman, TX (US); Donna J. Crowther, Seabrook, TX (US); Caol P. Huff, Houston, TX (US); Patrick Brant, Seabrook, TX (US); Jacqueline A. Lovell, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 141 days.

(21) Appl. No.: 13/306,263

(22) Filed: Nov. 29, 2011

(65) Prior Publication Data

US 2013/0137829 A1    May 30, 2013

(51) Int. Cl.
*C08F 293/00* (2006.01)
*C08F 285/00* (2006.01)

(52) U.S. Cl.
USPC ........... 526/281; 526/282; 526/283; 526/269; 526/75

(58) Field of Classification Search
USPC .............................. 526/269, 281, 283, 75, 282
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,973,414 A | 11/1990 | Nerger et al. | |
| 4,988,764 A | 1/1991 | Nishio et al. | |
| 5,026,948 A | 6/1991 | Forbus | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,621,047 A | 4/1997 | Nubel et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 6,017,859 A | 1/2000 | Rossi et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |
| 6,268,518 B1 | 7/2001 | Resconi et al. | |
| 6,410,666 B1 | 6/2002 | Grubbs et al. | |
| 6,444,773 B1 | 9/2002 | Markel | |
| 6,448,350 B1 | 9/2002 | Dall'Occo et al. | |
| 6,476,167 B2 | 11/2002 | Peters | |
| 6,590,048 B1 | 7/2003 | Furstner et al. | |
| 6,703,457 B2 | 3/2004 | Van Baar et al. | |
| 6,750,307 B2 | 6/2004 | Weng et al. | |
| 6,803,429 B2 | 10/2004 | Morgan et al. | |
| 6,897,261 B1 | 5/2005 | Machida et al. | |
| 6,939,930 B2 | 9/2005 | Reinking et al. | |
| 7,126,031 B2 | 10/2006 | Boussie et al. | |
| 7,247,385 B1 | 7/2007 | Tzoganakis et al. | |
| 7,276,567 B2 | 10/2007 | Voskoboynikov et al. | |
| 7,589,160 B2 | 9/2009 | Resconi et al. | |
| 7,820,607 B2 | 10/2010 | Matsuda et al. | |
| 7,943,716 B2 | 5/2011 | Resconi et al. | |
| 7,960,487 B2 | 6/2011 | Yang et al. | |
| 8,058,351 B2 | 11/2011 | Pawlow et al. | |
| 2002/0137978 A1 | 9/2002 | Grubbs et al. | |
| 2003/0161752 A1 | 8/2003 | Luk et al. | |
| 2004/0127649 A1 | 7/2004 | Arjunan | |
| 2004/0214953 A1 | 10/2004 | Yamada et al. | |
| 2004/0249046 A1 | 12/2004 | Abhari et al. | |
| 2005/0054793 A1 | 3/2005 | Reinking et al. | |
| 2005/0159299 A1 | 7/2005 | Rodriguez et al. | |
| 2005/0261440 A1 | 11/2005 | Dickakian et al. | |
| 2006/0052553 A1 | 3/2006 | Resconi et al. | |
| 2006/0270814 A1 | 11/2006 | Mako et al. | |
| 2007/0293640 A1 | 12/2007 | Jiang et al. | |
| 2008/0064891 A1 | 3/2008 | Lee | |
| 2008/0228017 A1 | 9/2008 | Burdett et al. | |
| 2008/0234451 A1 | 9/2008 | Kenwright et al. | |
| 2009/0221750 A1* | 9/2009 | Tsunogae et al. ............... 525/75 |
| 2009/0247441 A1 | 10/2009 | Baum | |
| 2009/0318640 A1 | 12/2009 | Brant et al. | |
| 2009/0318644 A1 | 12/2009 | Brant et al. | |
| 2009/0318646 A1 | 12/2009 | Brant et al. | |
| 2009/0318647 A1 | 12/2009 | Hagadorn et al. | |
| 2010/0069573 A1 | 3/2010 | Arriola et al. | |
| 2010/0152387 A1 | 6/2010 | Steininger et al. | |
| 2010/0152388 A1 | 6/2010 | Jiang et al. | |

FOREIGN PATENT DOCUMENTS

| | | |
|---|---|---|
| CN | 101011062 | 8/2007 |
| EP | 0 767 182 | 4/1997 |

(Continued)

OTHER PUBLICATIONS

Amin et al., "*Versatile Pathways for In Situ Polyolefin Functionalization with Heteroatoms: Catalytic Chain Transfer*", Angew. Chem. Int. Ed., 2008, vol. 47, pp. 2006-2025.

Chung, "*Synthesis of Functional Polyolefin Copolymers with Graft and Block Structures*", Prog. Polym. Sci., 2002, vol. 27, pp. 39-85.

Lopez et al., "*Synthesis of Well-Defined Polymer Architectures by, Successive Catalytic Olefin Polymerization and Living/Controlled Polymerization Reactions* ", Prog. Polym. Sci., 2007, vol. 32, pp. 419-454.

Mathers et al., "*Cross Metathesis Functionalization of Polyolefins*", Chem Commun, 2004, pp. 422-423.

Balboni et al., *C₂-Symmetric Zirconocenes for High Molecular Weight Amorphous Poly(propylene)*, Macromolecular Chemistry and Physics, 2001, vol. 202, No. 10, pp. 2010-2028.

(Continued)

*Primary Examiner* — Ling Choi
*Assistant Examiner* — David L Miller
(74) *Attorney, Agent, or Firm* — Kevin M. Faulkner; Catherine L. Bell

(57) ABSTRACT

This invention relates to a polymer of a cyclic olefin and a vinyl terminated macromonomer, and processes for the production thereof.

13 Claims, 1 Drawing Sheet

(56) References Cited

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 693 357 | 8/2006 |
| EP | 1 849 757 | 10/2007 |
| EP | 1 862 491 | 12/2007 |
| GB | 1 310 847 | 3/1973 |
| JP | 02-064115 | 3/1990 |
| JP | 1993-320260 | 3/1993 |
| JP | 2000-038420 | 2/2000 |
| JP | 2005-139284 | 6/2005 |
| JP | 2005-336092 | 12/2005 |
| JP | 2007-169340 | 7/2007 |
| JP | 2007-246433 | 9/2007 |
| JP | 2008-050278 | 3/2008 |
| JP | 2010-037555 | 2/2010 |
| JP | 2011-026448 | 2/2011 |
| JP | 2012-051859 | 3/2012 |
| JP | 2012-052062 | 3/2012 |
| WO | WO 95/27717 | 10/1995 |
| WO | WO 97/47665 | 12/1997 |
| WO | 98/40373 | 9/1998 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 02/079127 | 10/2002 |
| WO | WO 2004/031250 | 4/2004 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/141941 | 11/2008 |
| WO | WO 2009/009158 | 1/2009 |
| WO | WO 2009/155517 | 12/2009 |

OTHER PUBLICATIONS

Britovsek et al., *Novel Olefin Polymerization Catalysts Based on Iron and Cobalt*, Chemical Communications, 1998, No. 7, pp. 849-850.
Britovsek et al., *Iron and Cobalt Ethylene Polymerization Catalysts Bearing 2, 6-Bis(Imino)Pyridyl Ligands: Synthesis, Structures, and Polymerization Studies*, Journal of the American Chemical Society, 1999, vol. 121, No. 38, pp. 8728-8740.
Brzezinska et al., *Synthesis of ABA Triblock Copolymers via Acyclic Diene Metathesis Polymerization and Living Polymerization of α-Amino Acid-N-Carboxyanhydrides*, Macromolecules, 2001, vol. 34, pp. 4348-4354.
Bujadoux et al., *Use of bridged and non-bridged metallocene catalysts in high pressure/high temperature ethylene/α-olefin copolymerization*, Metallocene Polymers, 1995, pp. 377-402.
Chen et al., Reactive & Functional Polymers, 2008, vol. 68, No. 9, pp. 1307-1313.
Corey et al., "*Reactions of Hydrosilanes and Olefins in the Presence of $Cp_2MCl_2/nBuLi$*", Organometallics, 1992, vol. 11, pp. 672-683.
Cossy et al., "*Cross-Metathesis reaction. Generation of Highly Functionalized Olefins from Unsaturated Alcohols*", Journal of Organometallic Chemistry, 2001, vol. 634, Issue 2, pp. 216-221.
Hansell et al., *Additive-Free Clicking for Polymer Functionalization and Coupling by Tetrazine-Norbornene Chemistry*, Journal of the American Chemical Society, 2011, vol. 133, No. 35, pp. 13828-13831.
Herzon et al., "*Direct, Catalytic Hydroaminoalkylation of Unactivated Olefins with N-Alkyl Arylamines*", JACS, 2007, vol. 129, pp. 6690-6691.
Herzon et al., "*Hydroaminoalkylation of Unactivated Olefins with Dialkylamines*", JACS, 2007, vol. 130, pp. 14940-14941.

Kesti et al., "*Group 4 Metallocene Olefin Hydrosilyation Catalysts*", Organometallics, 1992, vol. 11, pp. 1095-1103.
Kolodka et al., "*Copolymerization of Propylene with Poly(Ethylene-Co-Propylene) Macromonomer and Branch Chain-Length Dependence of Rheological Properties*", Macromolecules, 2002, vol. 35, pp. 10062-10070.
Koo et al., "*Silicon-Modified Ziegler-Natta Polymerization. Catalytic Approaches to Silyl-Capped and Silyl-Linked Polyolefins Using "Single-Site" Cationic Ziegler-Natta Catalysts*", Journal of American Chemical Society, 1999, vol. 121, pp. 8791-8802.
Liu et al., *Kinetics of Initiation, Propagation, and Termination for the [rac-(C2H4(1-indenyl)2)ZrMe]{MeB(C6F5)3-Catalyzed Polymerization of 1-Hexene*, Journal of the American Chemical Society, 2001, vol. 123, pp. 11193-11207.
Markel, et al., "*Metallocene-Based Branch-Block Thermoplastic Elastomers*", Macromolecules, 2000, vol. 33, pp. 8541-8548.
Nagai et al., *Novel Well-defined Funcationalized Polyolefins and Polyolefin-polar Polymer Block Copolymers: Formations and Their Features*, Poly Preprints, 2008, vol. 49, No. 2, 776-777.
Ornelas et al., *Cross Olefin Metathesis for the Selective Functionalization, Ferrocenylation, and Solubilization in Water of Olefin-Terminated Dendrimers, Polymers, and Gold Nanoparticles and for a Divergent Dendrimer Constructions*, Journal of American Chemical Soc., 2008, vol. 130, No. 4, pp. 1495-1506.
Passaglia et al., "*Grafting of Diethyl Maleate and Maleic Anhydride Onto Styrene-b-(Ethylene-co-1-Butene)-b-Styrene Triblock Copolymer (SEBS)*", Polymer, 2000, vol. 41, pp. 4389-4400.
Quirk et al., "*Anionic Synthesis of Secondary Amine Functionalized Polymers by Reaction of Polymeric Organolithiums with N-Benzylidenemethylamine*", Macromolecular Chemistry and Physics, 2002, vol. 203, pp. 1178-1187.
Resconi et al., *Chain Transfer Reactions in Propylene Polymerization with Zirconocene Catalysts*, Topics in Catalysis, 1999, vol. 7, No. 1-4, pp. 145-163.
Rodriguez et al., *Poly(4-vinylpyridazine). First Synthesis, Characterization and Properties*, Polymeric Materials Science and Engineering, Proceedings of the ACS Division of Polymeric Materials Science and Engineering, 1990, vol. 63, pp. 376-382 (Abstract).
Rose et al., "*Poly(ethylene-co-propylene macromonomer)s: Synthesis and Evidence for Starlike Conformaitons in Dilute Solution*", Macromolecules, 2008, vol. 41, pp. 559-567.
Rybak et al., "*Acyclic Diene Metathesis with a Monomer with a Monomer from Renewable Resources: Control of Molecular Weight and One-Step Preparation of Block Copolymers*", ChemSusChem, 2008, vol. 1, pp. 542-547.
Shiono et al., *Copolymerization of poly(propylene) macromonomer with ethylene by (tertbutanamide)dimethyl(tetramethyl-qscyclopentadienyl) silane titanium dichloride/methylaluminoxane catalyst*, Macromol. Chem. Phys., 1997, vol. 198, pp. 3229-3237.
Weng et al., *Synthesis of Long-Chain Branched Propylene Polymers via Macromonomer Incorporation*, Macromol. Rapid Commun., 2001, vol. 22, No. 18, pp. 1488-1492.
Weng et al., *Synthesis of Vinyl-Terminated Isotactic Poly(propylene)*, Macromol. Rapid Commun., 2000, 21, No. 16, pp. 1103-1107.
Weng et al., *Long Chain Branched Isotactic Polypropylene*, Macromolecules, 2002, vol. 35, pp. 3838-3843.
Wu et al., *Synthesis of Polynorbornene-poly(ethylene-co-propylene) Diblock Copolymers*, Polymeric Materials Science and Engineering, 1998, vol. 78, pp. 158-159.
Xu et al., *Ethylene Copolymerization with 1-Octene Using a 2-Methylbenz[e] indenyl-Based ansa-Monocyclopentadienylamido Complex and Methylaluminoxane Catalyst*, Macromolecules, 1998, vol. 31, pp. 4724-4729.
Katayama, et al. "*Vinylideneruthenium Complexes in Catalysis*", Coordination Chemistry Reviews, 2004, vol. 248, pp. 1703-1715.

* cited by examiner

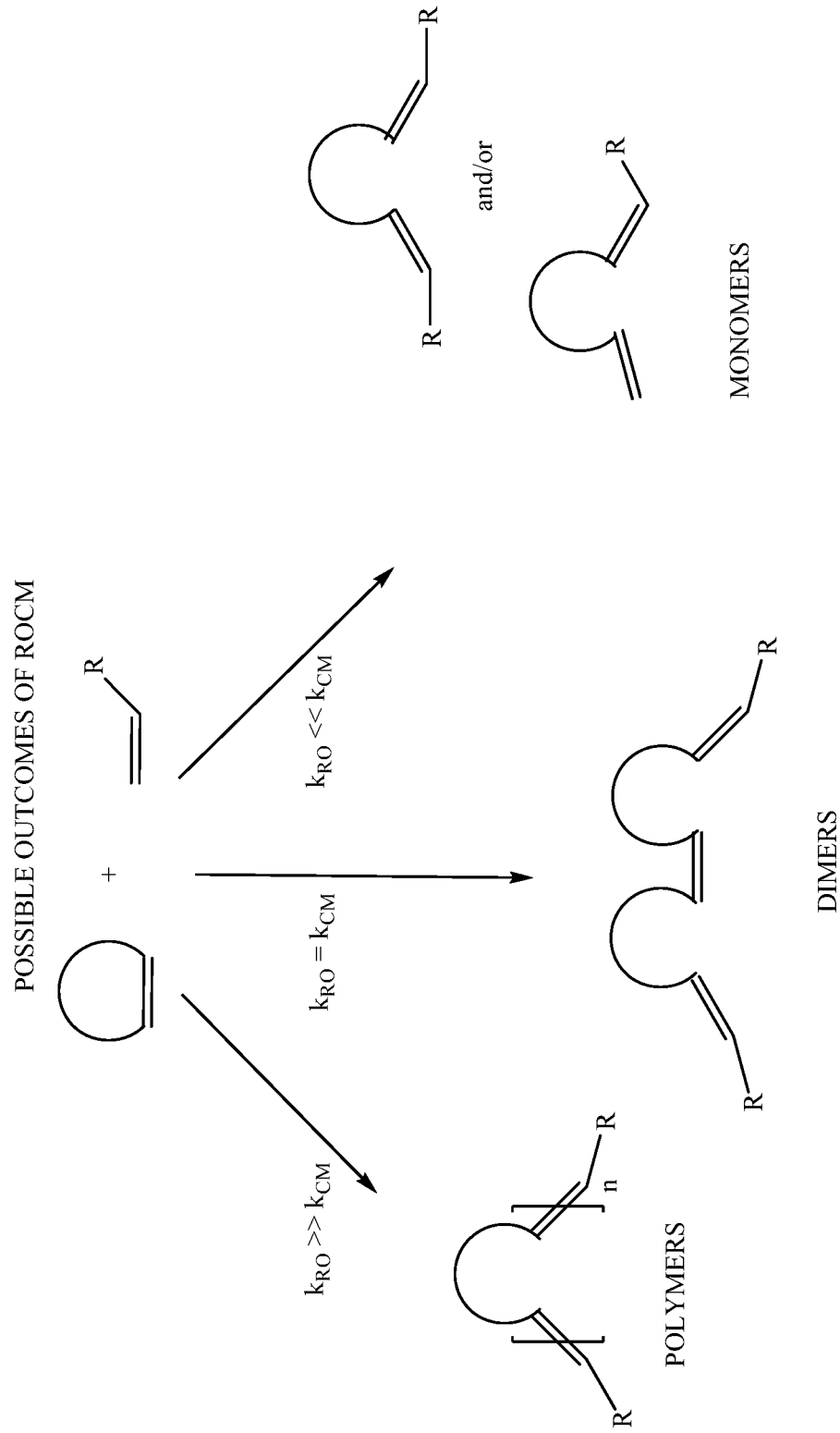

FUNCTIONALIZATION OF VINYL TERMINATED POLYMERS BY RING OPENING CROSS METATHESIS

STATEMENT OF RELATED CASES

This application relates to U.S. Ser. No. 12/488,093 filed on Jun. 19, 2009. This application also relates to U.S. Ser. No. 12/143,663 filed Jun. 20, 2008, U.S. Ser. No. 13/072,288 filed Mar. 25, 2011, and U.S. Ser. No. 13/072,249 filed Mar. 25, 2011.

FIELD OF THE INVENTION

This invention is directed toward functionalization of polymers, particularly vinyl-terminated polymers.

BACKGROUND OF THE INVENTION

Functionalization of polymers is often desirable to meet a particular manufacturing need. For example, polymers may be functionalized to improve toughness, enhance the acceptance of flame retardants, mineral stiffeners, glass or wood fibers, or other desired ingredients. Polymers may also be modified to help them combine more usefully or deliver higher value when recycled. Modifications can improve wetting, aid mix dispersion, filler adhesion, melt processing, surface-to-surface attraction, and other performance features. Such polymers are of interest for use in a broad range of applications as lubricants, compatibilizers, tie-layer modifiers, surfactants, and surface modifiers, among other things.

Methods for the production of polyolefins with end-functionalized groups are, however, typically multi-step processes that often create unwanted by-products and waste reactants and energy. However, metathesis has been used to functionalize polyolefins in a single step with some success.

Metathesis is generally thought of as the interchange of radicals between two compounds during a chemical reaction. There are several varieties of metathesis reactions, such as ring opening metathesis, acyclic diene metathesis, ring closing metathesis, and cross metathesis. For example, R. T. Mathers and G. W. Coates, *Chem. Commun.*, 2004, pp. 422-423 disclose examples of using cross-metathesis to functionalize polyolefins containing pendant vinyl groups to form polar-functionalized products with a graft-type structure.

Additionally, some reviews of methods to form end-functionalized polyolefins are: (a) S. B. Amin and T. J. Marks, *Angew. Chem. Int. Ed.*, 2008, 47, pp. 2006-2025; (b) T. C. Chung, *Prog. Polym. Sci.*, 2002, 27, pp. 39-85; and (c) R. G. Lopez, F. D'Agosto, C. Boisson, *Prog. Polym. Sci.*, 2007, 32, pp. 419-454. Even further, U.S. Ser. No. 12/488,093, filed Jun. 19, 2009, discloses end functionalized polyolefins prepared from vinyl terminated polyolefins by cross-metathesis.

A variation on ring-opening metathesis polymerization, which has to date been the subject of only limited research, is ring-open cross metathesis (ROCM). ROCM involves a tandem sequence in which a cycloolefin is opened and a second, acyclic olefin is then crossed onto the newly formed termini. For example, U.S. Pat. No. 6,803,429 discloses that certain Group 8 metal alkylidene complexes substituted with N-heterocyclic carbine ligands catalyze the ring-opening cross-metathesis of cycloolefins with acyclic olefinic reactants, particularly α,β-unsaturated carbonyl compounds. The ROCM products are said to be mainly monomeric, dimeric, or oligomeric species, rather than polymers.

Likewise, U.S. 2008/0064891 discloses ROCM reaction of cyclic olefins with seed oils and the like comprising contacting: (a) at least one olefinic substrate selected from (i) an unsaturated fatty acid, (ii) an unsaturated fatty alcohol, (iii) an esterification product of an unsaturated fatty acid with an alcohol, and (iv) an esterification product of a saturated fatty acid with an unsaturated alcohol; with (b) at least one cyclic olefin as a cross-metathesis partner; in the presence of (c) a ruthenium alkylidene olefin metathesis catalyst; and (d) under conditions effective to allow ring insertion cross-metathesis whereby the cyclic olefin is simultaneously opened and inserted into the olefinic substrate.

Further, WO 98/40373 discloses ROCM on solid supports to isolate the olefin immobilized on the resin, preventing unwanted olefin polymerization. Additional references of interest include: U.S. Pat. Nos. 4,988,764; 6,225,432; EP 1 693 357; U.S. Ser. No. 12/487,739; and U.S. Ser. No. 12/143,663.

In summary, there is a need to develop a means to provide functionalized polyolefins (particularly end-functionalized polyolefins) by metathesis reactions, particularly reactions with good conversion, preferably under mild reaction conditions with a minimal number of steps.

SUMMARY OF THE INVENTION

This invention relates to a polymer represented by the formula (A):

(A)

where $R_1$ is a hydrocarbyl group having greater than 25 carbon atoms;
$R_2$ and $R_3$ are the same or different and each is hydrogen or a hydrocarbyl group having from 1 to 40 carbon atoms, or $R_2$ and $R_3$ are joined to form a five-membered or six-membered ring, or substituted analogs thereof;
X is C, N, or O;
n is an integer from 1 to 10,000;
the dotted line indicates an optional double bond; and
wherein the polymer comprises one or more vinyl terminated macromonomer derived units.

This invention also relates to a polymer represented by the formula (A):

(A)

where
$R_2$ and $R_3$ are the same or different and each is hydrogen or a hydrocarbyl group having from 1 to 40 carbon atoms, or $R_2$ and $R_3$ are joined to form a five-membered or six-membered ring, or substituted analogs thereof;
X is C, N, or O;
n is an integer from 1 to 10,000; and
the dotted line indicates an optional double bond;

where $R_1$ is (i) a polymer comprising of one or more $C_4$ to $C_{40}$ higher olefin derived units, where the higher olefin polymer comprises substantially no propylene derived units; and or (ii) a copolymer comprising (a) from about 20 mol % to about 99.9 mol % of at least one $C_5$ to $C_{40}$ higher olefin and (b) from about 0.1 mol % to about 80 mol % of propylene; and or (iii) a copolymer comprising (a) from about 80 mol % to about 99.9 mol % of at least one $C_4$ olefin and (b) from about 0.1 mol % to about 20 mol % of propylene.

This invention also relates to a process to produce the polymers described above.

This invention also relates to a composition comprising the polymers described above.

BRIEF DESCRIPTION OF THE FIGURES

FIG. 1 is a representation of some of the possible outcomes of ring opening cross-metathesis.

DETAILED DESCRIPTION

Various terms as used herein are defined below. To the extent a term used in a claim is not defined below, it should be given the broadest definition persons in the pertinent art have given that term as reflected in at least one printed publication or issued patent.

"Polyolefin" means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A "monoolefin" has one double bond, for example, an alpha, omega, pendant, or internal double bond.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like.

An oligomer is typically a polymer having a low molecular weight (such as an Mn of less than 25,000 g/mol, preferably less than 2,500 g/mol) or a low number of mer units (such as 75 mer units or less, typically 50 mer units or less, even 20 mer units or less, even 10 mer units or less).

When a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

Additionally, an ethylene polymer or oligomer contains at least 50 mol % of ethylene, a propylene polymer or oligomer contains at least 50 mol % of propylene, a butene polymer or oligomer contains at least 50 mol % of butene, and so on.

Mn is number average molecular weight, Mw is weight average molecular weight, and Mz is z average molecular weight. Molecular weight distribution (MWD) is defined to be Mw divided by Mn. Unless otherwise noted, all molecular weight units (e.g., Mw, Mn, Mz) are g/mol.

The new notation for the Periodic Table Groups is used as described in Chemical and Engineering News, 63(5), 27 (1985). Room temperature is 23° C. unless otherwise noted.

The term "substituted" means that a hydrogen group has been replaced with a hydrocarbyl group, a heteroatom or a heteroatom containing group. For example, methyl cyclopentadiene is a cyclopentadiene (Cp) group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise the terms "group" and "substituent" are also used interchangeably in this document. For purposes of this invention, "hydrocarbyl radical" is defined to be $C_1$ to $C_{20}$ radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with a heteroatom or heteroatom containing group, preferably with at least one functional group such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen or a hydrocarbyl.

A "substituted alkyl" is an alkyl radical made of carbon and hydrogen where at least one hydrogen is replaced by a heteroatom, a heteroatom containing group, or a cyclic substituted or unsubstituted hydrocarbyl group having 1 to 30 carbon atoms.

A "substituted aryl" group is an aryl radical made of carbon and hydrogen where at least one hydrogen is replaced by a heteroatom, a heteroatom containing group, or a linear, branched, or cyclic substituted or unsubstituted hydrocarbyl group having 1 to 30 carbon atoms.

A "heteroatom containing ring" is a cyclic ring where one or more ring vertices are occupied by a heteroatom (N, O, P, S). For example, tetrahydrofuran is a heteroatom containing ring, having an oxygen atom as part of the ring backbone.

An "anionic ligand" is a negatively charged ligand which donates one or more pairs of electrons to a metal ion. A "neutral donor ligand" is a neutrally charged ligand which donates one or more pairs of electrons to a metal ion.

When catalysts are described as comprising neutral stable forms of the components, it is well understood by one of ordinary skill in the art, that the ionic form of the component is the form that reacts with the monomers to produce polymers. In the description herein, the transition metal compound used for catalysis may be described as a catalyst precursor, a pre-catalyst compound, a catalyst, or a catalyst compound, and these terms are used interchangeably.

Additionally, a "reactor" is any container(s) in which a chemical reaction occurs.

"Mol %" means mole percent, "wt %" means weight percent, and "vol %" means volume percent.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

This invention relates to a new class of functionalized polymers and processes to produce them. These polymers are end-functionalized with a cyclic functional group and possess the ability to be further functionalized through a terminal vinyl group. This ability to add further functionality post-polymerization affords appreciable synthetic flexibility that may be of tremendous commercial utility. For instance, bulk polymer properties such as viscosity may be tailored by utilizing this synthetic handle to increase the size and viscosity of the polymer. These functionalized vinyl-terminated polymers (also referred to as functionalized vinyl terminated macromonomers) and processes to produce them are discussed further below.

Functionalized Vinyl Terminated Polymers

This invention relates to a polymer represented by the formula (A):

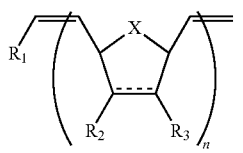

(A)

where $R_1$ is a hydrocarbyl group having greater than 25 carbon atoms, preferably greater than 30 carbon atoms, greater than 40 carbon atoms, or greater than 50 carbon atoms; preferably from 31 to 100,000 carbons, from 40 to 75,000 carbons, from 50 to 60,000 carbons; preferably $R_1$ is represented by the formula (B):

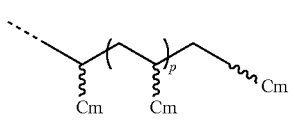

(B)

wherein Cm is a $C_4$ to $C_{40}$ olefin derived unit (preferably Cm is one or more derived units of butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 3 to 39 (preferably from 3 to 29, preferably from 4 to 19, preferably from 4 to 11); and p is an integer greater than 1 (preferably from 1 to 10,000, from 1 to 5,000, from 1 to 2,500, from 1 to 1,000, from 1 to 500, or from 1 to 50); preferably $R_1$ is represented by the formula (C):

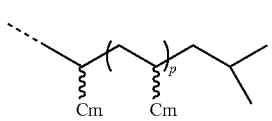

(C)

wherein Cm is a $C_3$ to $C_{40}$ olefin derived unit (preferably Cm is one or more derived units of propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 2 to 39 (preferably from 2 to 29, preferably from 3 to 19, preferably from 4 to 11); and p is an integer greater than 1 (preferably from 1 to 10,000, from 1 to 5,000, from 1 to 2,500, from 1 to 1,000, from 1 to 500, or from 1 to 50);

$R_2$ and $R_3$ are the same or different and each is hydrogen or a hydrocarbyl group having from 1 to 40 carbon atoms (preferably from 1 to 30, from 2 to 15, and from 2 to 12), or $R_2$ and $R_3$ are joined to form a five-membered or six-membered ring, or substituted analogs thereof (preferably $R_2$ and $R_3$ are joined to form a heteroatom containing ring; preferably $R_2$ and $R_3$ are joined to form a dicarboxylic anhydride);

X is C, N, or O (preferably X is C or O, preferably X is C);

n is an integer from 1 to 10,000 (preferably from 1 to 5,000, from 1 to 2,500, from 1 to 1,000, from 1 to 500, or from 1 to 50); and the dotted line indicates an optional double bond, wherein the polymer, preferably $R_1$, comprises one or more vinyl terminated macromonomer derived units (preferably the vinyl terminated macromonomer is one or more of:

(i) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(ii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iii) a copolymer having an Mn of 300 g/mol or more (measured by $^1$H NMR), and comprises
(a) from about 80 mol % to about 99.9 mol % of at least one $C_4$ olefin; and (b) from about 0.1 mol % to about 20 mol % of propylene; and wherein the vinyl terminated macromonomer has at least 40% allyl chain ends relative to total unsaturation;

(iv) a co-oligomer having an Mn of 300 to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer; 2) X=45, when greater than 60 mol % and less than 70 mol % ethylene is present in the co-oligomer; and 3) X=(1.83*(mol % ethylene incorporated)-83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum;

(vi) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(vii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;

(viii) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0; and (ix) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum).

In any embodiment described herein, $R_1$ is preferably not an ethylene polymer. In any embodiment described herein, $R_1$ is preferably not a propylene polymer. In any embodiment described herein, $R_1$ is preferably not a butene polymer.

In a preferred embodiment of the invention $R_1$ is derived from vinyl terminated polymer (i) described above. In a preferred embodiment of the invention $R_1$ is derived from vinyl terminated polymer (ii) described above. In a preferred embodiment of the invention $R_1$ is derived from vinyl terminated polymer (iii) described above.

The term "vinyl terminated macromonomer" is used interchangeably with the terms "vinyl terminated polymer" and "vinyl terminated polyolefin". The phrase "Cm is a $C_X$ to $C_y$ olefin derived unit" (where x and y are the integers described above) means that Cm as depicted in the formulae has one less carbon than the olefin it was derived from, i.e., one carbon of the originating olefin is incorporated into the polymer backbone.

In some embodiments of this invention, the polymer is represented by the formula (D):

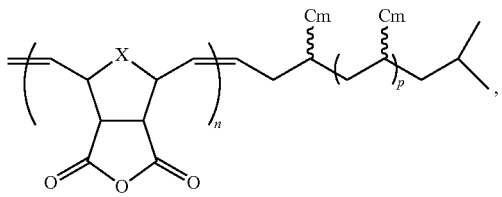

(D)

wherein X is C, N, or O (preferably C or O, preferably C); n is an integer from 1 to 10,000 (preferably from 1 to 5,000, from 1 to 2,500, from 1 to 1,000, from 1 to 500, or from 1 to 50); Cm is a $C_3$ to $C_{40}$ olefin derived unit (preferably Cm is one or more derived units of propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 2 to 39 (preferably from 2 to 29, preferably from 3 to 19, preferably from 4 to 11); and p is an integer greater than 1 (preferably from 1 to 10,000, from 1 to 5,000, from 1 to 2,500, from 1 to 1,000, from 1 to 500, or from 1 to 50).

In a preferred embodiment of the invention, the vinyl terminated macromonomer derived units are derived from (i), (ii) or (iii) above.

In another embodiment, this invention relates to a polymer represented by the formula (A):

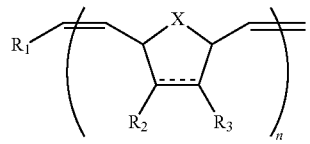

(A)

where
$R_2$ and $R_3$; X, n, and the dotted line are as defined above and $R_1$ is (i) a polymer, preferably having an Mn of at least 200 g/mol (measured by $^1$H NMR), comprising of one or more $C_4$ to $C_{40}$ higher olefin derived units (preferably $C_5$ to $C_{40}$ higher olefin derived units), where the higher olefin polymer comprises substantially no propylene derived units; and or (ii) a copolymer, preferably having an Mn of at least 300 g/mol (measured by $^1$H NMR), comprising (a) from about 20 mol % to about 99.9 mol % of at least one $C_5$ to $C_{40}$ higher olefin and (b) from about 0.1 mol % to about 80 mol % of propylene; and or (iii) a copolymer, preferably having an Mn of at least 300 g/mol (measured by $^1$H NMR), comprising (a) from about 80 mol % to about 99.9 mol % of at least one $C_4$ olefin and (b) from about 0.1 mol % to about 20 mol % of propylene.

In some embodiments of this invention, the polymer is hydrogenated. The polymers produced herein may be hydrogenated by contacting the polymer with hydrogen and a hydrogenation catalyst. This hydrogenation step is often used to reduce the bromine number (preferably below 2.0, preferably below 1.8). Bromine number is determined by ASTM D 1159. In a preferred embodiment, the bromine number of the hydrogenated polymer decreases by at least 50% (preferably at least 75%) as compared to the starting polymer.

Preferably, the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports. A preferred hydrogenation catalyst is nickel supported on kieselguhr, or platinum or palladium supported on alumina, or cobalt-molybdenum supported on alumina Usually, a high nickel content catalyst, such as 60% Ni on Kieselguhr catalyst, is used, or a supported catalyst with high amount of Co—Mo loading. Alternately, the hydrogenation catalyst is nickel supported on Kieselguhr, silica, alumina, clay, or silica-alumina.

In a preferred embodiment, the polymer is contacted with hydrogen (preferably at a hydrogen pressure of from 25 psi to 2500 psi (0.17 MPa to 17.24 MPa), preferably from 100 psi to 2000 psi (0.69 MPa to 13.79 MPa)), and a hydrogenation catalyst at a temperature from 25° C. to 350° C., preferably 100° C. to 300° C., and/or a time period from 5 minutes to 100 hours, preferably from 5 minutes to 24 hours. The hydrogenation process can be accomplished in a slurry reactor in a batch operation or in a continuous stirred tank reactor (CSTR), where the catalyst, hydrogen, and the polymer are continuously added to the reactor to allow for certain residence time, usually 5 minutes to 10 hours to allow complete hydrogenation of the unsaturated olefins. The amount of catalyst added is usually very small, for example, 0.001 wt % to 20 wt % of the polymer feed or preferably 0.01 wt % to 10 wt %, to compensate for the catalyst deactivation. The catalyst and hydrogenated polymer are continuously withdrawn from the reactor. The product mixture may then be filtered, centrifuged, or settled to remove the solid hydrogenation catalyst. The catalyst can be regenerated and reused.

The hydrogenation process can also be accomplished by a fixed bed process, in which the solid catalyst is packed inside a tubular reactor and heated to reactor temperature.

Uses of Polymer

In a preferred embodiment of the present invention, hydrogenation of the polymers produced herein yields products useful as lubricants. Compositions comprising the polymers produced herein are also disclosed. In such embodiments, the composition is a lubricant or lubricant base stock, an adhesive, a viscosity modifier, or a fuel additive.

In another embodiment, a novel lubricant comprises the polymers produced in this invention, alone or together with one or more other base stocks, including Group I to Group V base stocks with kinematic viscosity (ASTM D445) range from 1.5 cSt to 100 cSt at 100° C. to formulate suitable viscosity grades. In addition, additives of one or more of: thickeners, viscosity index improvers, antioxidants, anti-wear additives, detergent/dispersant/inhibitor packages, and/or anti-rust additives may be added. In a preferred embodiment, the polymers produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, or gas turbine engine oil. These are examples of additives used in finished lubricant formulations. Additional information on additives used in product formulation can be found in "Lubricants and Lubrications", Ed. By T. Mang and W. Dresel, by Wiley-VCH GmbH, Weinheim 2001.

The polymers prepared herein may be further functionalized by reacting a heteroatom containing group (preferably amines, aldehydes, alcohols, acids, succinic acid, maleic acid, and/or maleic anhydride) with the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides). In some embodiments, the polymers produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739 filed on Jun. 19, 2009 (Published as WO 2009/155472).

The functionalized polymers can be used in lubricant, oil additivation, and many other applications.

The vinyl end group of the polymers of the present invention is synthetically facile thereby allowing for functionalization of the resultant polymer. Some examples of functionalized polymers include those that are functionalized with maleic acid or maleic anhydride groups. The functionalized polymers can in turn be derivatized with a derivatizing compound, such as described in U.S. Pat. No. 6,022,929; A. Toyota, T. Tsutsui, and N. Kashiwa, Polymer Bulletin 48, 213-219, 2002; and J. Am. Chem. Soc., 1990, 112, 7433-7434. The derivatizing compound can react with the functional groups of the functionalized capped polymer by any means known in the art, such as nucleophilic substitution, Mannich Base condensation, and the like. The derivatizing compound can be polar and/or contain reactive derivative groups. Preferred derivatizing compounds are selected from hydroxy containing compounds, amines, metal salts, anhydride containing compounds, and acetyl halide containing compounds. The derivatizing compounds can comprise at least one nucleophilic group and preferably at least two nucleophilic groups. An exemplary derivatized polymer may be made by contacting a functionalized polymer, for example, one substituted with a carboxylic acid/anhydride or ester, with a nucleophilic reagent, for example, amines, alcohols (including polyols), amino alcohols, reactive metal compounds and the like. (For more information, please see U.S. Pat. No. 6,022,929, column 33, line 27 to column 74, line 63.)

Processes to Produce Functionalized Polymers

The functionalized polymers of the present invention may be produced in any manner known to one of skill in the art. These functionalized polymers are advantageously produced from vinyl terminated macromonomers, such as those described in U.S. Ser. No. 13/072,288; U.S. Ser. No. 13/072,249; and U.S. Ser. No. 12/143,663. More particularly, in embodiments of the present invention, processes for producing a polymer comprise contacting at least (A) one cyclic olefin with (B) at least one vinyl terminated macromonomer in the presence of (C) a metathesis catalyst, under suitable polymerization conditions.

Ring-Opening Cross Metathesis Polymerization (ROCM)

In processes of the present invention, the product comprises a ROCM product of a cyclic olefin and a vinyl terminated macromonomer. The wide synthetic availability of cyclic olefins makes this route particularly attractive.

In particular, this invention also relates to a process to produce a polymer represented by the formula (A):

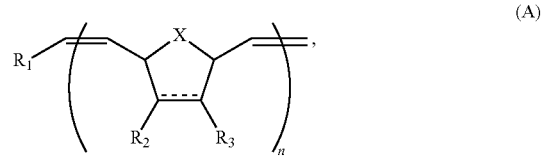

where $R_1$ is a hydrocarbyl group having greater than 25 carbon atoms;

$R_2$ and $R_3$ are the same or different and each is hydrogen or a hydrocarbyl group having from 1 to 40 carbon atoms, or $R_2$ and $R_3$ are joined to form a five-membered or six-membered ring, or substituted analogs thereof;

X is C, N, or O;

n is an integer from 1 to 10,000; and the dotted line indicates an optional double bond, wherein the polymer comprises one or more vinyl terminated macromonomer derived units; the process comprising contacting:

at least one cyclic olefin (preferably norbornene, norbornadiene, dicyclopentadiene, cyclopentene, cycloheptene, cyclooctene, cyclooctadiene, cyclododecene, 7-oxanorbornene, 7-oxanorbornadiene, and substituted derivatives therefrom; more preferably cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, cis-5-norbornene-endo-2,3-dicarboxylic anhydride, dimethyl norbornene carboxylate, norbornene-exo-2,3-carboxylic anhydride, and their respective homologs and derivatives) with at least one vinyl terminated macromonomer in the presence of one or more metathesis catalysts (preferably one or more of:

(i) an alkene metathesis catalyst represented by the Formula (E):

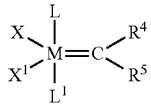

Formula (E)

where

M is a Group 8 metal, preferably Ru or Os, preferably Ru;

X and $X^1$ are, independently, any anionic ligand, preferably a halogen (preferably chlorine), an alkoxide or a triflate, or X and $X^1$ may be joined to form a dianionic group and may form a single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form a single ring of up to 30 non-hydrogen atoms or a multinuclear ring system of up to 30 non-hydrogen atoms;

$L^1$ and $X^1$ may be joined to form a multidentate monoanionic group and may form a single ring of up to 30 non-hydrogen atoms or a multinuclear ring system of up to 30 non-hydrogen atoms;

$R^4$ and $R^5$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^5$ and $L^1$ or $X^1$ may be joined to form a single ring of up to 30 non-hydrogen atoms or a multinuclear ring system of up to 30 non-hydrogen atoms; and $R^4$ and L or X may be joined to form a single ring of up to 30 non-hydrogen atoms or a multinuclear ring system of up to 30 non-hydrogen atoms; and/or (ii) a metathesis catalyst represented by the Formula (F):

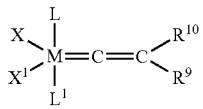

Formula (F)

where M is Os or Ru, preferably Ru;

X, $X^1$, L, and $L^1$ are as described above for Formula E; and $R^9$ and $R^{10}$ may be different or the same and may be hydrogen, substituted or unsubstituted alkyl, or substituted or unsubstituted aryl; and/or (iii) a metathesis catalyst represented by the formula (G):

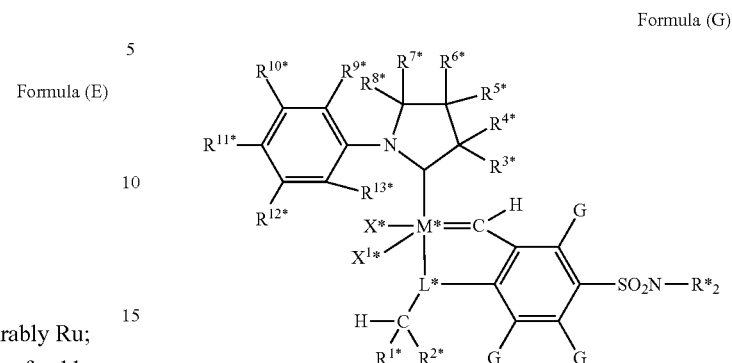

Formula (G)

where $M^*$ is a Group 8 metal, preferably Ru or Os, preferably Ru;

$X^*$ and $X^{1*}$ are, independently, any anionic ligand, preferably a halogen (preferably chlorine), an alkoxide or an alkyl sulfonate, or $X^*$ and $X^{1*}$ may be joined to form a dianionic group and may form a single ring of up to 30 non-hydrogen atoms or a multinuclear ring system of up to 30 non-hydrogen atoms;

$L^*$ is N—$R^{}$, 0, P—$R^{}$, or S, preferably N—$R^{}$ or O ($R^{}$ is a $C_1$ to $C_{30}$ hydrocarbyl or substituted hydrocarbyl, preferably methyl, ethyl, propyl or butyl);

$R^*$ is hydrogen or a $C_1$ to $C_{30}$ hydrocarbyl or substituted hydrocarbyl, preferably methyl;

$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;

each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;

$R^{10*}$, $R^{11*}$, $R^{12*}$ are, independently hydrogen or a $C_1$ to $C_{30}$ hydrocarbyl or substituted hydrocarbyl, preferably hydrogen or methyl;

each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); and where any two adjacent R groups may form a single ring of up to 8 non-hydrogen atoms or a multinuclear ring system of up to 30 non-hydrogen atoms; and/or (iv) a Group 8 metal complex represented by the formula (H):

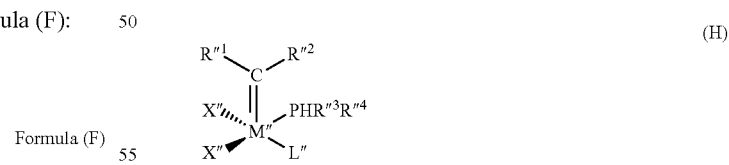

(H)

wherein

M" is a Group 8 metal (preferably M is ruthenium or osmium, preferably ruthenium);

each X is independently an anionic ligand (preferably selected from the group consisting of halides, alkoxides, aryloxides, and alkyl sulfonates, preferably a halide, preferably chloride);

$R"^1$ and $R"^2$ are independently selected from the group consisting of hydrogen, a $C_1$ to $C_{30}$ hydrocarbyl, and a $C_1$ to $C_{30}$ substituted hydrocarbyl (preferably $R"^1$ and $R"^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);

R'''³ and R'''⁴ are independently selected from the group consisting of hydrogen, $C_1$ to $C_{12}$ hydrocarbyl groups, substituted $C_1$ to $C_{12}$ hydrocarbyl groups, and halides (preferably R'''³ and R'''⁴ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and L" is a neutral donor ligand, preferably L" is selected from the group consisting of a phosphine, a sulfonated phosphine, a phosphite, a phosphinite, a phosphonite, an arsine, a stibine, an ether, an amine, an imine, a sulfoxide, a carboxyl, a nitrosyl, a pyridine, a thioester, a cyclic carbene, and substituted analogs thereof; preferably a phosphine, a sulfonated phosphine, an N-heterocyclic carbene, a cyclic alkyl amino carbene, and substituted analogs thereof (preferably L" is selected from a phosphine, an N-heterocyclic carbene, a cyclic alkyl amino carbene, and substituted analogs thereof); and/or (v) a Group 8 metal complex represented by the formula (I):

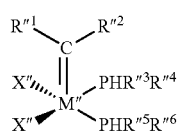

(I)

wherein

M" is a Group 8 metal (preferably M is ruthenium or osmium, preferably ruthenium);

each X is independently an anionic ligand (preferably selected from the group consisting of halides, alkoxides, aryloxides, and alkyl sulfonates, preferably a halide, preferably chloride);

R'''¹ and R'''² are independently selected from the group consisting of hydrogen, a $C_1$ to $C_{30}$ hydrocarbyl, and a $C_1$ to $C_{30}$ substituted hydrocarbyl (preferably R'''¹ and R'''² are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);

R'''³, R'''⁴, R'''⁵, and R'''⁶ are independently selected from the group consisting of hydrogen, $C_1$ to $C_{12}$ hydrocarbyl groups, substituted $C_1$ to $C_{12}$ hydrocarbyl groups, and halides (preferably R'''³, R'''⁴, R'''⁵, and R'''⁶ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and at a temperature of 20° C. to 200° C. (preferably 50° C. to 160° C., preferably 60° C. to 140° C.) and a pressure of 0 MPa to 1000 MPa (preferably 0.5 MPa to 500 MPa, preferably 1 MPa to 250 MPa) for a residence time of 0.5 seconds to 10 hours (preferably 1 second to 5 hours, preferably 1 minute to 1 hour).

In a preferred embodiment, the catalyst is represented by formula F. In a preferred embodiment, the catalyst is represented by formula G. In a preferred embodiment, the catalyst is represented by formula H. In a preferred embodiment, the catalyst is represented by formula I.

The ROCM involves a tandem sequence in which a cyclic olefin is opened and a vinyl terminated macromonomer is crossed onto the newly formed termini. After the initial ring opening of the cyclic olefin, the metal-bound intermediate has two options: reaction with another cyclic olefin or reaction with the vinyl terminated macromonomer. It will be appreciated that a ROCM reaction between a cyclic olefin and a vinyl terminated macromonomer reactant can result in several different types of reaction products, depending, in large part, on the relative rates of the ring-opening metathesis reaction and the cross-metathesis reaction between the vinyl terminated macromonomer and the cyclic olefin, as shown in FIG. 1; where n=1 to 100,000 and R is a hydrocarbyl group derived from the vinyl terminated macromonomer and having greater than 25 carbon atoms (preferably greater than 30 carbon atoms, greater than 40 carbon atoms, or greater than 50 carbon atoms).

Accordingly, a cyclic olefin will undergo a ring opening reaction in the presence of the catalyst at a rate constant $k_{RO}$, and the vinyl terminated macromonomer will undergo a cross-metathesis reaction with the ring opened cyclic olefin at a rate constant $k_{CM}$. When $k_{CM}$ is greater than or equal to $k_{RO}$, the ROCM product is predominantly a monomer, dimer, and/or oligomer. More specifically, when $k_{CM}$ is approximately equal to $k_{RO}$, the ROCM product is predominantly a dimer, while when $k_{RO}$ is greater than $k_{CM}$, the ROCM product is predominantly higher Mw. Oligomers are of particular interest because their internal olefin moieties may be further functionalized by metathesis or other transformations. It should be appreciated that $k_{RO}$ will be higher for moderately and highly strained cyclic olefins such as norbornadiene, but lower for low-strain olefins such as cyclopentene and cyclohexene.

The reactants (including the vinyl terminated macromonomer and the cyclic olefin) are typically combined in a reaction vessel at a temperature of 20° C. to 200° C. (preferably 50° C. to 160° C., preferably 60° C. to 140° C.) and a pressure of 0 MPa to 1000 MPa (preferably 0.5 MPa to 500 MPa, preferably 1 MPa to 250 MPa) for a residence time of 0.5 seconds to 10 hours (preferably 1 second to 5 hours, preferably 1 minute to 1 hour). The molecular weight of the polymer products may be controlled by, inter alia, choice of catalyst, ratio of vinyl terminated macromonomer to cyclic olefin, and/or possibly temperature.

In certain embodiments of this invention, where an olefin is a gaseous olefin, the olefin pressure is typically greater than 5 psig (34.5 kPa); preferably, greater than 10 psig (68.9 kPa); and more preferably, greater than 45 psig (310 kPa). When a diluent is used with the gaseous olefin, the aforementioned pressure ranges may also be suitably employed as the total pressure of olefin and diluent. Likewise, when a liquid olefin is employed and the process is conducted under an inert gaseous atmosphere, then the aforementioned pressure ranges may be suitably employed for the inert gas pressure.

The quantity of metathesis catalyst that is employed in the process of this invention is any quantity that provides for an operable metathesis reaction. Preferably, the ratio of moles of monomers (e.g., cyclic olefins and vinyl terminated macromonomer) to moles of metathesis catalyst is typically greater than 10:1, preferably greater than 100:1, preferably greater than 1,000:1, preferably greater than 10,000:1, preferably greater than 25,000:1, preferably greater than 50,000:1, preferably greater than 100,000:1).

Typically, 0.00001 moles to 1.0 moles, preferably 0.0001 moles to 0.05 moles, preferably 0.0005 moles to 0.01 moles of catalyst are charged to the reactor per mole of vinyl terminated macromonomer charged.

Typically, 0.00001 moles to 1.0 moles, preferably 0.0001 moles to 0.05 moles, preferably 0.0005 moles to 0.01 moles of catalyst are charged to the reactor per mole of cyclic olefin charged.

The ratio of vinyl terminated macromonomer to cyclic olefin monomer is preferably 0.01:1 to 1000:1, preferably 1:1 to 100:1 depending on the final polymer sought. It has been noted that in the instant invention, the ratio of vinyl terminated macromonomer to cyclic olefin monomer has an effect on molecular weight.

The process is typically a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants, e.g., propane in propylene).

Suitable diluents/solvents for the process include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic. Preferably, aromatics are present in the solvent at less than 1 wt %, preferably at 0.5 wt %, preferably at 0 wt % based upon the weight of the solvents. In another embodiment, suitable diluents/solvents also include aromatic hydrocarbons, such as toluene or xylenes, and chlorinated solvents, such as dichloromethane. In a preferred embodiment, the feed for the process comprises 60 vol % solvent or less, based on the total volume of the feed, preferably 40 vol % or less, preferably 20 vol % or less.

In another embodiment, the process is a slurry process. As used herein, the term "slurry process" or "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent).

The process may be batch, semi-batch, or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruders, pipes, or pumps).

In a preferred embodiment, the productivity of the process is at least 200 g of polymer (preferably polymer represented by formula (A)) per mmol of catalyst per hour, preferably at least 5000 g/mmol/hour, preferably at least 10,000 g/mmol/hr, preferably at least 300,000 g/mmol/hr.

This invention further relates to a process, preferably an in-line process, preferably a continuous process, to produce polymer represented by formula (A), comprising introducing cyclic olefin, vinyl terminated macromonomer, and alkene metathesis catalyst into a reactor, obtaining a reactor effluent containing polymer, optionally removing (such as flashing off) solvent, unused monomer and/or other volatiles, obtaining polymer then hydrogenating or functionalizing the polymer.

A "reaction zone" also referred to as a "polymerization zone" is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

Preferably, the process produces the metathesis product (polymers having the formula A disclosed herein) in good yield (greater than 50%). Preferably, the process produces little or no dimerization. The extent of dimerization is determined by the comparison of the degree of polymerization (ROCM) as obtained from methods A and B, described in the Examples. In some embodiments, the degree of ROCM obtained from Method A differs from that obtained from Method B by less than 25%, preferably less than 20%, preferably less than 15%, and most preferably less than 10%.

Each of the reactants is discussed below, in turn.

A. Cyclic Olefins

The cyclic olefin may be a single cyclic olefin, or a combination of cyclic olefins, that is a mixture of two or more different cyclic olefins. The cyclic olefins may be strained or unstrained, monocyclic, or polycyclic; and may optionally include heteroatoms and/or one or more functional groups. For clarification, dicyclopentadiene, norbornene, norbornadiene, ethylidene norbornene, and vinyl norbornene are polycyclic.

Suitable cyclic olefins include, but are not limited to norbornene, norbornadiene, dicyclopentadiene, cyclopentene, cycloheptene, cyclooctene, cyclooctadiene, cyclododecene, 7-oxanorbornene, 7-oxanorbornadiene, and substituted derivatives therefrom. Illustrative examples of suitable substituents include, but are not limited to, hydroxyl, thiol, ketone, aldehyde, ester, ether, amine, imine, amide, nitro, carboxylic acid, disulfide, carbonate, isocyanate, carbodiimide, carboalkoxy, and halogen. Preferred cyclic olefins include cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, cis-5-norbornene-endo-2,3-dicarboxylic anhydride, dimethyl norbornene carboxylate, norbornene-exo-2,3-carboxylic anhydride, and dicyclopentadiene. In a preferred embodiment, the cyclic olefin is derived from substituted or unsubstituted cyclopentadiene, such as dicyclopentadiene, norbornene, norbornadiene, cis-5-norbornene-endo-2,3-dicarboxylic anhydride, dimethyl norbornene carboxylate, norbornene-exo-2,3-carboxylic anhydride, ethylidene norbornene, vinyl norbornene, and the like.

B. Vinyl Terminated Macromonomers

A "vinyl terminated macromonomer," as used herein, refers to one or more of:

(i) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(ii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iii) a copolymer having an Mn of 300 g/mol or more (measured by $^1$H NMR), and comprises (a) from about 80 mol % to about 99.9 mol % of at least one $C_4$ olefin, (b) from about 0.1 mol % to about 20 mol % of propylene; and wherein the vinyl terminated macromonomer has at least 40% allyl chain ends relative to total unsaturation;

(iv) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer; 2) X=45, when greater than 60 mol % and less than 70 mol % ethylene is present in the co-oligomer; and 3) X=(1.83*(mol % ethylene incorporated)-83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum;

(vi) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(vii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;

(viii) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0; and (ix) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum.

In some embodiments of the present invention, the vinyl terminated macromonomer has an Mn of at least 200 g/mol, (preferably 200 g/mol to 100,000 g/mol, preferably 200 g/mol to 75,000 g/mol, preferably 200 g/mol to 60,000 g/mol, preferably 300 g/mol to 60,000 g/mol, or preferably 750 g/mol to 30,000 g/mol) (measured by $^1$H NMR), and comprise one or more (preferably two or more, three or more, four or more, and the like) $C_4$ to $C_{40}$ (preferably $C_4$ to $C_{30}$, $C_4$ to $C_{20}$, or $C_4$ to $C_{12}$, preferably butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (preferably less than 0.1 wt % propylene, preferably 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (preferably greater than 2:1, greater than 2.5:1, greater than 3:1, greater than 5:1, or greater than 10:1); and even further optionally, preferably, substantially no isobutyl chain ends (preferably less than 0.1 wt % isobutyl chain ends). In some embodiments, the vinyl terminated macromonomers may also comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene). Such vinyl terminated macromonomers are further described in U.S. Ser. No. 13/072,288, which is hereby incorporated by reference.

In some embodiments of the present invention, the vinyl terminated macromonomers described herein have an Mn (measured by $^1$H NMR) of greater than 200 g/mol (preferably 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from about 20 mol % to 99.9 mol % (preferably from about 25 mol % to about 90 mol %, from about 30 mol % to about 85 mol %, from about 35 mol % to about 80 mol %, from about 40 mol % to about 75 mol %, or from about 50 mol % to about 95 mol %) of at least one $C_5$ to $C_{40}$ (preferably $C_6$ to $C_{20}$) higher olefin; and (b) from about 0.1 mol % to 80 mol % (preferably from about 5 mol % to 70 mol %, from about 10 mol % to about 65 mol %, from about 15 mol % to about 55 mol %, from about 25 mol % to about 50 mol %, or from about 30 mol % to about 80 mol %) of propylene;

wherein the vinyl terminated macromonomer has at least 40% allyl chain ends (preferably at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (preferably greater than 2.5:1, greater than 3:1, greater than 5:1, or greater than 10:1); and even further optionally, an allyl chain end to vinylene ratio is greater than 1:1 (preferably greater than 2:1 or greater than 5:1). Such macromonomers are further described in U.S. Ser. No. 13/072,249, hereby incorporated by reference.

In another embodiment of the present invention, the vinyl terminated macromonomer has an Mn of 300 g/mol or more (measured by $^1$H NMR, preferably 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from about 80 mol % to about 99.9 mol % of at least one $C_4$ olefin, preferably about 85 mol % to about 99.9 mol %, more preferably about 90 mol % to about 99.9 mol %;

(b) from about 0.1 mol % to about 20 mol % of propylene, preferably about 0.1 mol % to about 15 mol %, more preferably about 0.1 mol % to about 10 mol %; and wherein the vinyl terminated macromonomer has at least 40% allyl chain ends (preferably at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Ser. No. 13/072,249, which is hereby incorporated by reference.

In other embodiments of the present invention, the vinyl terminated macromonomer is a propylene co-oligomer having an Mn of 300 g/mol to 30,000 g/mol as measured by $^1$H NMR (preferably 400 g/mol to 20,000 g/mol, preferably 500 g/mol to 15,000 g/mol, preferably 600 g/mol to 12,000 g/mol, preferably 800 g/mol to 10,000 g/mol, preferably 900 g/mol to 8,000 g/mol, preferably 900 g/mol to 7,000 g/mol), comprising 10 mol % to 90 mol % propylene (preferably 15 mol % to 85 mol %, preferably 20 mol % to 80 mol %, preferably 30 mol % to 75 mol %, preferably 50 mol % to 90 mol %) and 10 mol % to 90 mol % (preferably 85 mol % to 15 mol %, preferably 20 mol % to 80 mol %, preferably 25 mol % to 70 mol %, preferably 10 mol % to 50 mol %) of one or more alpha-olefin comonomers (preferably ethylene, butene, hexene, or octene, preferably ethylene), wherein the oligomer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50(−0.94 (mol % ethylene incorporated)+100)}), when 10 mol % to 60 mol % ethylene is present in the co-oligomer; 2) X=45 (alternately 50, alternately 60), when greater than 60 mol % and less than 70 mol % ethylene is present in the co-oligomer; and 3) X=(1.83*(mol % ethylene incorporated)−83, {alternately 1.20 [1.83*(mol % ethylene incorporated)-83], alternately 1.50 [1.83*(mol % ethylene incorporated)−83]}), when 70 mol % to 90 mol % ethylene is present in the co-oligomer. Such macromonomers are further described in U.S. Ser. No. 12/143,663, which is hereby incorporated by reference.

In other embodiments of the present invention, the vinyl terminated macromonomer is a propylene oligomer, comprising more than 90 mol % propylene (preferably 95 mol % to 99 mol %, preferably 98 mol % to 9 mol %) and less than 10 mol % ethylene (preferably 1 mol % to 4 mol %, preferably 1 mol % to 2 mol %), wherein the oligomer has: at least 93% allyl chain ends (preferably at least 95%, preferably at least 97%, preferably at least 98%); a number average molecular weight (Mn) of about 400 g/mol to about 30,000 g/mol, as measured by $^1$H NMR (preferably 500 g/mol to 20,000 g/mol, preferably 600 g/mol to 15,000 g/mol, preferably 700 g/mol to 10,000 g/mol, preferably 800 g/mol to 9,000 g/mol, preferably 900 g/mol to 8,000 g/mol, preferably 1,000 g/mol to 6,000 g/mol); an isobutyl chain end to allylic vinyl group ratio of 0.8:1 to 1.35:1.0, and less than 1400 ppm aluminum, (preferably less than 1200 ppm, preferably less than 1000 ppm, preferably less than 500 ppm, preferably less than 100 ppm). Such macromonomers are further described in U.S. Ser. No. 12/143,663.

In other embodiments of the present invention, the vinyl terminated macromonomer is a propylene oligomer, comprising: at least 50 mol % (preferably 60 mol % to 90 mol %, preferably 70 mol % to 90 mol %) propylene and from 10 mol % to 50 mol % (preferably 10 mol % to 40 mol %, preferably 10 mol % to 30 mol %) ethylene, wherein the oligomer has: at least 90% allyl chain ends (preferably at least 91%, preferably at least 93%, preferably at least 95%, preferably at least 98%); an Mn of about 150 g/mol to about 20,000 g/mol, as measured by $^1$H NMR (preferably 200 g/mol to 15,000 g/mol, preferably 250 g/mol to 15,000 g/mol, preferably 300 g/mol to 10,000 g/mol, preferably 400 g/mol to 9,500 g/mol, preferably 500 g/mol to 9,000 g/mol, preferably 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (preferably at less than 1 mol %, preferably less than 0.5 mol %, preferably at 0 mol %). Such macromonomers are further described in U.S. Ser. No. 12/143,663.

In other embodiments of the present invention, the vinyl terminated macromonomer is a propylene oligomer, comprising: at least 50 mol % (preferably at least 60 mol %, preferably 70 mol % to 99.5 mol %, preferably 80 mol % to 99 mol %, preferably 90 mol % to 98.5 mol %) propylene, from 0.1 mol % to 45 mol % (preferably at least 35 mol %, preferably 0.5 mol % to 30 mol %, preferably 1 mol % to 20 mol %, preferably 1.5 mol % to 10 mol %) ethylene, and from 0.1 mol % to 5 mol % (preferably 0.5 mol % to 3 mol %, preferably 0.5 mol % to 1 mol %) $C_4$ to $C_{12}$ olefin (such as butene, hexene or octene, preferably butene), wherein the oligomer has: at least 90% allyl chain ends (preferably at least 91%, preferably at least 93%, preferably at least 95%, preferably at least 98%); a number average molecular weight (Mn) of about 150 g/mol to about 15,000 g/mol, as measured by $^1$H NMR (preferably 200 g/mol to 12,000 g/mol, preferably 250 g/mol to 10,000 g/mol, preferably 300 g/mol to 10,000 g/mol, preferably 400 g/mol to 9500 g/mol, preferably 500 g/mol to 9,000 g/mol, preferably 750 g/mol to 9,000 g/mol); and an isobutyl chain end to allylic vinyl group ratio of 0.8:1 to 1.35:1.0. Such macromonomers are further described in U.S. Ser. No. 12/143,663.

In other embodiments of the present invention, the vinyl terminated macromonomer is a propylene oligomer, comprising: at least 50 mol % (preferably at least 60 mol %, preferably 70 mol % to 99.5 mol %, preferably 80 mol % to 99 mol %, preferably 90 mol % to 98.5 mol %) propylene, from 0.1 mol % to 45 mol % (preferably at least 35 mol %, preferably 0.5 mol % to 30 mol %, preferably 1 mol % to 20 mol %, preferably 1.5 mol % to 10 mol %) ethylene, and from 0.1 mol % to 5 mol % (preferably 0.5 mol % to 3 mol %, preferably 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (preferably at least 91%, preferably at least 93%, preferably at least 95%, preferably at least 98%); a number average molecular weight (Mn) of about 150 g/mol to about 20,000 g/mol, as measured by $^1$H NMR (preferably 200 g/mol to 15,000 g/mol, preferably 250 g/mol to 12,000 g/mol, preferably 300 g/mol to 10,000 g/mol, preferably 400 g/mol to 9,500 g/mol, preferably 500 g/mol to 9,000 g/mol, preferably 750 g/mol to 9,000 g/mol); and an isobutyl chain end to allylic vinyl group ratio of 0.7:1 to 1.35:1.0. Such macromonomers are further described in U.S. Ser. No. 12/143,663.

In other embodiments of the present invention, the vinyl terminated macromonomer is a propylene homo-oligomer, comprising propylene and less than 0.5 wt % comonomer, preferably 0 wt % comonomer, wherein the oligomer has:
i) at least 93% allyl chain ends (preferably at least 95%, preferably at least 96%, preferably at least 97%, preferably at least 98%, preferably at least 99%);
ii) a number average molecular weight (Mn) of about 500 g/mol to about 20,000 g/mol, as measured by $^1$H NMR (preferably 500 g/mol to 15,000 g/mol, preferably 700 g/mol to 10,000 g/mol, preferably 800 g/mol to 8,000 g/mol, preferably 900 g/mol to 7,000 g/mol, preferably 1,000 g/mol to 6,000 g/mol, preferably 1,000 g/mol to 5,000 g/mol);
iii) an isobutyl chain end to allylic vinyl group ratio of 0.8:1 to 1.3:1.0; and
iv) less than 1400 ppm aluminum, (preferably less than 1200 ppm, preferably less than 1000 ppm, preferably less than 500 ppm, preferably less than 100 ppm). Such macromonomers are also further described in U.S. Ser. No. 12/143,663.

The vinyl terminated macromonomers may be homopolymers, copolymers, terpolymers, and so on.

Vinyl terminated macromonomers generally have a saturated chain end (or terminus) and/or an unsaturated chain end, or terminus The unsaturated chain end of the vinyl terminated macromonomer comprises an "allyl chain end" or a "3-alkyl" chain end. An allyl chain end is represented by CH$_2$CH—CH$_2$-, as shown in the formula:

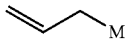

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated oligomers in J. American Chemical Soc., 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a C$_1$ to C$_{38}$ alkyl), also referred to as a "3-alkyl vinyl end group" or a "3-alkyl vinyl termination", is represented by the formula:

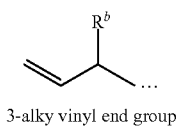

3-alky vinyl end group where "····" represents the polyolefin chain and R$^b$ is a C$_1$ to C$_{38}$ alkyl group, preferably a C$_1$ to C$_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data is collected at 120° C. at a frequency of at least 100 MHz, using a Bruker 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-d$_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends.

The "allyl chain end to vinylene chain end ratio" is defined to be the ratio of the percentage of allyl chain ends to the percentage of vinylene chain ends.

Vinyl terminated macromonomers typically also have a saturated chain end. In polymerizations comprising C$_4$ or greater monomers (or "higher olefin" monomers), the saturated chain end may be a C$_4$ or greater (or "higher olefin") chain end, as shown in the formula below:

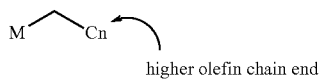

higher olefin chain end where M represents the polymer chain and n is an integer selected from 4 to 40. This is especially true when there is substantially no ethylene or propylene in the polymerization. In an ethylene/(C$_4$ or greater monomer) copolymerization, the polymer chain may initiate growth in an ethylene monomer, thereby generating a saturated chain end which is an ethyl chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

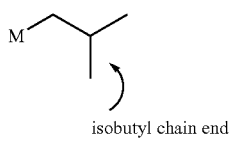

isobutyl chain end where M represents the polymer chain. Isobutyl chain ends are determined according to the procedure set out in WO 2009/155471.

Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 mHz is used). Data is recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Mn may also be determined using a GPC-DRI method, as described below. For the purpose of the claims, Mn is determined by $^1$H NMR. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

C. Metathesis Catalysts

Any suitable metathesis catalyst may be used in the processes of the present invention. A suitable metathesis catalyst is a compound that catalyzes the reaction between a cyclic olefin and a vinyl terminated macromonomer to produce a polymer represented by the formula (A).

In some embodiments of this invention, the alkene metathesis catalyst is represented by the Formula (E):

Formula (E)

where

M is a Group 8 metal, preferably Ru or Os, preferably Ru;

X and X$^1$ are, independently, any anionic ligand, preferably a halogen (preferably chlorine), an alkoxide or a triflate, or X and X$^1$ may be joined to form a dianionic group and may form a single ring of up to 30 non-hydrogen atoms or a multinuclear ring system of up to 30 non-hydrogen atoms;

L and L$^1$ are, independently, a neutral two electron donor, preferably a phosphine or a N-heterocyclic carbene, L and L$^1$ may be joined to form a single ring of up to 30 non-hydrogen atoms or a multinuclear ring system of up to 30 non-hydrogen atoms;

L and X may be joined to form a multidentate monoanionic group and may form a single ring of up to 30 non-hydrogen atoms or a multinuclear ring system of up to 30 non-hydrogen atoms;

L$^1$ and X$^1$ may be joined to form a multidentate monoanionic group and may form a single ring of up to 30 non-hydrogen atoms or a multinuclear ring system of up to 30 non-hydrogen atoms;

R$^4$ and R$^5$ are, independently, hydrogen or C$_1$ to C$_{30}$ substituted or unsubstituted hydrocarbyl (preferably a C$_1$ to C$_{30}$ substituted or unsubstituted alkyl or a substituted or unsubstituted C$_4$ to C$_{30}$ aryl);

R$^5$ and L$^1$ or X$^1$ may be joined to form a single ring of up to 30 non-hydrogen atoms or a multinuclear ring system of up to 30 non-hydrogen atoms; and R$^4$ and L or X may be joined to form a single ring of up to 30 non-hydrogen atoms or a multinuclear ring system of up to 30 non-hydrogen atoms.

Preferred alkoxides include those where the alkyl group is a phenol, substituted phenol (where the phenol may be substituted with up to 1, 2, 3, 4, or 5 C$_1$ to C$_{12}$ hydrocarbyl groups) or a $C_1$ to $C_{10}$ hydrocarbyl, preferably a $C_1$ to $C_{10}$ alkyl group, preferably methyl, ethyl, propyl, butyl, or phenyl.

Preferred phosphines are represented by the formula: $PR^{3'}R^{4'}R^{5'}$, where $R^{3'}$ is a secondary alkyl or cycloalkyl (preferably a $C_3$ to $C_{12}$ secondary alkyl or cycloalkyl), and $R^{4'}$ and $R^{5'}$ are aryl, $C_1$ to $C_{10}$ primary alkyl, secondary alkyl, or cycloalkyl. $R^{4'}$ and $R^{5'}$ may be the same or different. Preferred phosphines include $P(cyclohexyl)_3$, $P(cyclopentyl)_3$, and/or $P(isopropyl)_3$.

Preferred triflates are represented by the Formula (J):

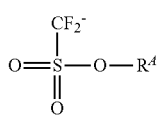

Formula (J)

where $R^4$ is hydrogen or a $C_1$ to $C_{30}$ hydrocarbyl group, preferably a $C_1$ to $C_{12}$ alkyl group, preferably methyl, ethyl, propyl, butyl, or phenyl.

Preferred N-heterocyclic carbenes are represented by the Formula (II) or the Formula (III):

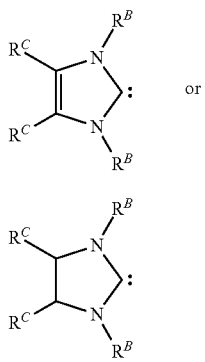

Formula (II)

or

Formula (III)

where each $R^B$ is independently a hydrocarbyl group or substituted hydrocarbyl group having 1 to 40 carbon atoms, preferably methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, phenol, substituted phenol, or $CH_2C(CH_3)_3$; and each $R^C$ is hydrogen, a halogen, or a $C_1$ to $C_{12}$ hydrocarbyl group, preferably hydrogen, bromine, chlorine, methyl, ethyl, propyl, butyl, or phenyl.

In other useful embodiments, one of the N groups bound to the carbene in formula (II) or (III) is replaced with an S, O, or P atom, preferably an S atom.

Other useful N-heterocyclic carbenes include the compounds described in Hermann, W. A. Chem. Eur. J., 1996, 2, pp. 772 and 1627; Enders, D. et al. Angew. Chem. Int. Ed., 1995, 34, pg. 1021; Alder R. W., Angew. Chem. Int. Ed., 1996, 35, pg. 1121; and Bertrand, G. et al., Chem. Rev., 2000, 100, pg. 39.

In a preferred embodiment, the metathesis catalyst is one or more of tricyclohexylphosphine[1,3-bis(2,4,6-trimethylphenyl)imidazol-2-ylidene][3-phenyl-1H-inden-1-ylidene]ruthenium(II)dichloride, tricyclohexylphosphine[3-phenyl-1H-inden-1-ylidene][1,3-bis(2,4,6-trimethylphenyl)-4,5-dihydro-imidazol-2-ylidene]ruthenium(II)dichloride, tricyclohexylphosphine[1,3-bis(2,4,6-trimethylphenyl)-4,5-dihydroimidazol-2-ylidene][(phenylthio)methylene]ruthenium(II)dichloride, bis(tricyclohexylphosphine)-3-phenyl-1H-inden-1-ylideneruthenium(II)dichloride, 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II)dichloride, and [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride. In a preferred embodiment, the catalyst is 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II)dichloride and/or tricyclohexylphosphine[3-phenyl-1H-inden-1-ylidene][1,3-bis(2,4,6-trimethylphenyl)-4,5-dihydroimidazol-2-ylidene]ruthenium(II)dichloride.

In another embodiment, the metathesis catalyst is represented by Formula (E) above, where: M is Os or Ru; $R^5$ is hydrogen; X and $X^1$ may be different or the same and are any anionic ligand; L and $L^1$ may be different or the same and are any neutral electron donor; and $R^4$ may be hydrogen, substituted or unsubstituted alkyl, or substituted or unsubstituted aryl. $R^4$ is preferably hydrogen, $C_1$ to $C_{20}$ alkyl, or aryl. The $C_1$ to $C_{20}$ alkyl may optionally be substituted with one or more aryl, halide, hydroxy, $C_1$ to $C_{20}$ alkoxy, or $C_2$ to $C_{20}$ alkoxycarbonyl groups. The aryl may optionally be substituted with one or more $C_1$ to $C_{20}$ alkyl, aryl, hydroxyl, $C_1$ to $C_5$ alkoxy, amino, nitro, or halide groups. L and $L^1$ are preferably phosphines of the formula $PR^{3'}R^{4'}R^{5'}$, where $R^{3'}$ is a secondary alkyl or cycloalkyl, and $R^{4'}$ and $R^{5'}$ are aryl, $C_1$ to $C_{10}$ primary alkyl, secondary alkyl, or cycloalkyl. $R^{4'}$ and $R^{5'}$ may be the same or different. L and $L^1$ are preferably the same and are —$P(cyclohexyl)_3$, —$P(cyclopentyl)_3$, or —$P(isopropyl)_3$. X and $X^1$ are most preferably the same and are chlorine.

In another embodiment of the present invention, the metathesis catalyst is a ruthenium and/or osmium carbene compound represented by the Formula (F):

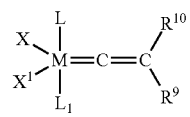

Formula (F)

where M is Os or Ru, preferably Ru; X, $X^1$, L, and $L^1$ are as described above for Formula (E); and $R^9$ and $R^{10}$ may be different or the same and may be hydrogen, substituted or unsubstituted alkyl, or substituted or unsubstituted aryl. The $R^9$ and $R^{10}$ groups may optionally include one or more of the following functional groups: alcohol, thiol, ketone, aldehyde, ester, ether, amine, imine, amide, nitro, carboxylic acid, disulfide, carbonate, isocyanate, carbodiimide, carboalkoxy, and halogen groups. Such compounds and their synthesis are described in, inter alia, U.S. Pat. No. 6,111,121.

In another embodiment, the metathesis catalyst useful herein may be any of the catalysts described in U.S. Pat. Nos. 6,111,121; 5,312,940; 5,342,909; 7,329,758; 5,831,108; 5,969,170; 6,759,537; 6,921,735; and U.S. Patent Publication No. 2005-0261451 A1, including, but not limited to,
benzylidene-bis(tricyclohexylphosphine)dichlororuthenium,
benzylidene[1,3-bis(2,4,6-trimethylphenyl)-2 imidazolidinylidene]dichloro(tricyclohexyl phosphine) ruthenium, dichloro(o-isopropoxyphenylmethylene)(tricyclohexylphosphine)ruthenium(II),
(1,3-bis-(2,4,6-trimethylphenyl)-2-imidazolidinylidene) dichloro(o-isopropoxyphenylmethylene)ruthenium,
1,3-bis(2-methylphenyl)-2-imidazolidinylidene]dichloro(2-isopropoxyphenylmethylene) ruthenium(II),
[1,3-bis(2,4,6-trimethylphenyl)-2-imidazolidinylidene] dichloro[3-(2-pyridinyl)propylidene]ruthenium(II),
[1,3-bis(2-methylphenyl)-2-imidazolidinylidene]dichloro (phenylmethylene) (tricyclohexylphosphine)ruthenium (II),
[1,3-bis(2,4,6-trimethylphenyl)-2-imidazolidinylidene] dichloro(3-methyl-2-butenylidene) (tricyclohexylphosphine)ruthenium(II), and
[1,3-bis(2,4,6-trimethylphenyl)-2-imidazolidinylidene] dichloro(benzylidene)bis(3-bromopyridine)ruthenium (II).

In another embodiment, the metathesis catalyst is represented by the formula (G):

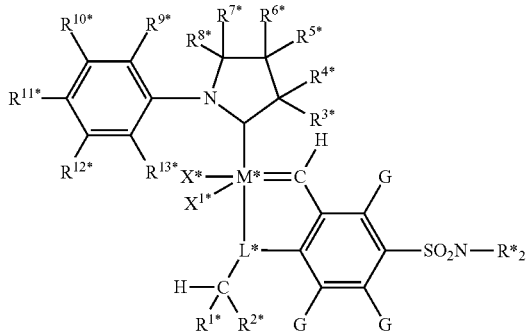

Formula (G)

where
M* is a Group 8 metal, preferably Ru or Os, preferably Ru;
X* and $X^{1*}$ are, independently, any anionic ligand, preferably a halogen (preferably chlorine), an alkoxide or an alkyl sulfonate, or X* and $X^{1*}$ may be joined to form a dianionic group and may form a single ring of up to 30 non-hydrogen atoms or a multinuclear ring system of up to 30 non-hydrogen atoms;
L* is N—R, O, P—R, or S, preferably N—R or O (R is a $C_1$ to $C_{30}$ hydrocarbyl or substituted hydrocarbyl, preferably methyl, ethyl, propyl or butyl);
R* is hydrogen or a $C_1$ to $C_{30}$ hydrocarbyl or substituted hydrocarbyl, preferably methyl;
$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;
each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;
$R^{10*}$, $R^{11*}$, $R^{12*}$ are, independently hydrogen or a $C_1$ to $C_{30}$ hydrocarbyl or substituted hydrocarbyl, preferably hydrogen or methyl;
each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); and
where any two adjacent R groups may form a single ring of up to 8 non-hydrogen atoms or a multinuclear ring system of up to 30 non-hydrogen atoms.

Preferably, any two adjacent R groups may form a fused ring having from 5 to 8 non-hydrogen atoms. Preferably, the non-hydrogen atoms are C and/or O. Preferably, the adjacent R groups form fused rings of 5 to 6 ring atoms, preferably 5 to 6 carbon atoms. By adjacent is meant any two R groups located next to each other, for example $R^{3*}$ and $R^{4*}$ can form a ring and/or $R^{11*}$ and $R^{12*}$ can form a ring.

In a preferred embodiment, the metathesis catalyst compound comprises one or more of:
2-(2,6-diethylphenyl)-3,5,5,5-tetramethylpyrrolidine[2-(i-propoxy)-5-(N,N-dimethylamino sulfonyl)phenyl]methylene ruthenium dichloride;
2-(mesityl)-3,3,5,5-tetramethylpyrrolidine[2-(i-propoxy)-5-(N,N-dimethylaminosulfonyl)phenyl]methylene ruthenium dichloride;
2-(2-isopropyl)-3,3,5,5-tetramethylpyrrolidine[2-(i-propoxy)-5-(N,N-dimethylaminosulfonyl)phenyl]methylene ruthenium dichloride;
2-(2,6-diethyl-4-fluorophenyl)-3,3,5,5-tetramethylpyrrolidine[2-(i-propoxy)-5-(N,N-dimethylaminosulfonyl)phenyl]methylene ruthenium dichloride; and mixtures thereof.

For further information on such metathesis catalysts, please see U.S. Ser. No. 12/939,054, filed Nov. 3, 2010, claiming priority to and the benefit of U.S. Ser. No. 61/259,514, filed Nov. 9, 2009. Many of the above named catalysts are generally available from Sigma-Aldrich Corp. (St. Louis, Mo.) or Strem Chemicals, Inc. (Newburyport, Mass.).

In a preferred embodiment of the present invention, the invention relates to a metathesis catalyst comprising: a Group 8 metal complex represented by the formula (H):

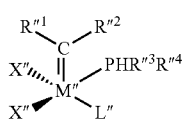

(H)

wherein
M" is a Group 8 metal (preferably M is ruthenium or osmium, preferably ruthenium);
each X" is independently an anionic ligand (preferably selected from the group consisting of halides, alkoxides, aryloxides, and alkyl sulfonates, preferably a halide, preferably chloride);
$R''^1$ and $R''^2$ are independently selected from the group consisting of hydrogen, a $C_1$ to $C_{30}$ hydrocarbyl, and a $C_1$ to $C_{30}$ substituted hydrocarbyl (preferably $R''^1$ and $R''^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);
$R''^3$ and $R''^4$ are independently selected from the group consisting of hydrogen, $C_1$ to $C_{12}$ hydrocarbyl groups, substituted $C_1$ to $C_{12}$ hydrocarbyl groups, and halides (preferably $R''^3$ and $R''^4$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and
L" is a neutral donor ligand, preferably L" is selected from the group consisting of a phosphine, a sulfonated phosphine, a phosphite, a phosphinite, a phosphonite, an arsine, a stibine, an ether, an amine, an imine, a sulfoxide, a carboxyl, a nitrosyl, a pyridine, a thioester, a cyclic carbene, and substituted analogs thereof; preferably a phosphine, a sulfonated phosphine, an N-heterocyclic carbene, a cyclic alkyl amino carbene, and substituted analogs thereof (preferably L" is selected from a phosphine, an N-heterocyclic carbene, a cyclic alkyl amino carbene, and substituted analogs thereof).

A "cyclic carbene" may be defined as a cyclic compound with a neutral dicoordinate carbon center featuring a lone pair of electrons. Such cyclic carbenes may be represented by the formula (IV) below:

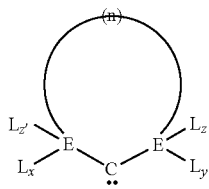

(IV)

where n is a linking group comprising from one to four ring vertices selected from the group consisting of C, Si, N, P, O, and S, with available valences optionally occupied by H, oxo, hydrocarbyl, or substituted hydrocarbyl groups; preferably, n comprises two ring vertices of carbon with available valences occupied by H, oxo, hydrocarbyl or substituted hydrocarbyl groups; preferably n is $C_2H_2$, $C_2H_4$, or substituted versions thereof;

each E is independently selected from the group comprising C, N, S, O, and P, with available valences optionally occupied by Lx, Ly, Lz, and Lz'; preferably, at least one E is a C; preferably, one E is a C and the other E is a N; preferably, both E's are C; and Lx, Ly, Lz, and Lz' are independently selected from the group comprising hydrogen, hydrocarbyl groups, and substituted hydrocarbyl groups; preferably, Lx, Ly, Lz, and Lz' are independently selected from the group comprising a hydrocarbyl group and substituted hydrocarbyl group having 1 to 40 carbon atoms; preferably, Lx, Ly, Lz, and Lz' are independently selected from the group comprising $C_{1-10}$ alkyl, substituted $C_{1-10}$ alkyl, $C_{2-10}$ alkenyl, substituted $C_{2-10}$ alkenyl, $C_{2-10}$ alkynyl, substituted $C_{2-10}$ alkynyl, aryl, and substituted aryl; preferably, Lx, Ly, Lz, and Lz' are independently selected from the group comprising methyl, ethyl, propyl, butyl (including isobutyl and n-butyl), pentyl, cyclopentyl, hexyl, cyclohexyl, octyl, cyclooctyl, nonyl, decyl, cyclodecyl, dodecyl, cyclododecyl, mesityl, adamantyl, phenyl, benzyl, toluoyl, chlorophenyl, 2,6-diethylphenyl, 2,6-diisopropylphenyl, 2-isopropylphenyl, 2-ethyl-6-methylphenyl, 3,5-ditertbutylphenyl, 2-tertbutylphenyl, and 2,3,4,5,6-pentamethylphenyl. Useful substituents include $C_{1-10}$ alkyl, $C_{2-10}$ alkenyl, $C_{2-10}$ alkynyl, aryl, $C_{1-10}$ alkoxy, $C_{2-10}$ alkenyloxy, $C_{2-10}$ alkynyloxy, aryloxy, $C_{2-10}$ alkoxycarbonyl, $C_{1-10}$ alkylthio, $C_{1-10}$ alkylsulfonyl, fluoro, chloro, bromo, iodo, oxo, amino, imine, nitrogen heterocycle, hydroxy, thiol, thiono, phosphorous, and carbene groups.

Examples of cyclic carbenes useful in embodiments of the present invention include:

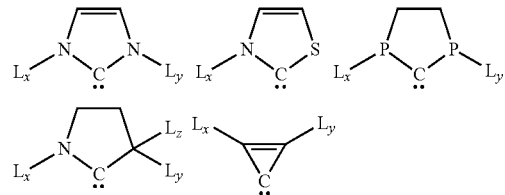

where Lx, Ly, and Lz are as defined above. In some embodiments, at least two of Lx, Ly, Lz, and Lz' may be joined to form a 3- to 12-membered spirocyclic ring, with available valences optionally occupied by H, oxo, halogens, hydrocarbyl or substituted hydrocarbyl groups. Useful substituents include $C_{1-10}$ alkyl, $C_{2-10}$ alkenyl, $C_{2-10}$ alkynyl, aryl, $C_{1-10}$ alkoxy, $C_{2-10}$ alkenyloxy, $C_{2-10}$ alkynyloxy, aryloxy, $C_{2-10}$ alkoxycarbonyl, $C_{1-10}$ alkylthio, $C_{1-10}$ alkylsulfonyl, fluoro, chloro, bromo, iodo, oxo, amino, imine, nitrogen heterocycle, hydroxy, thiol, thiono, phosphorous, and carbene groups.

Preferred cyclic carbenes include N-heterocyclic carbenes (NHCs). For purposes of this invention and claims thereto, NHCs are cyclic carbenes of the types described in Formula II above, where each E is N and the available valences on the N are occupied by Lx and Ly.

Preferred NHCs may be represented by the formula:

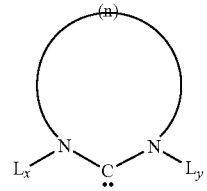

where n, Lx, and Ly are as described above in Formula (IV).

Some particularly useful NHCs include:

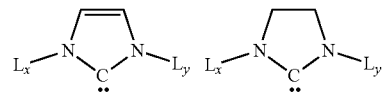

where Lx and Ly are as described above. Other useful NHCs include the compounds described in Hermann, W. A. Chem. Eur. J. 1996, 2, 772 and 1627; Enders, D. et al., Angew. Chem. Int. Ed. 1995, 34, 1021; Alder R. W., Angew. Chem. Int. Ed. 1996, 35, 1121; U.S. Ser. No. 61/314,388; and Bertrand, G. et al., Chem. Rev. 2000, 100, 39.

Particularly preferred cyclic carbenes include cyclic alkyl amino carbines (CAACs). In all embodiments herein, CAACs are cyclic carbenes of the types described in Formula II above, where one E is N and the other E is C, and the available valences on the N and C are occupied by Lx, Ly, and Lz. CAACs may be represented by the formula:

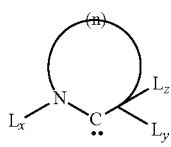

where
n, Lx, Ly, and Lz are as described above in Formula (IV).
Some particularly useful CAACs include:

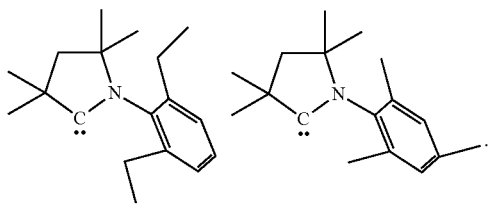

Other useful CAACs include the compounds described in U.S. Pat. No. 7,312,331; U.S. Ser. No. 61/259,514; and Bertrand et al, *Angew. Chem. Int. Ed.* 2005, 44, 7236-7239.

Other carbenes useful in embodiments of the present invention include thiazolyldenes, P-heterocyclic carbenes (PHCs), and cyclopropenylidenes.

With respect to Group 8 metal complexes of Formula (H), the phosphine ligands (PHR''³R''⁴) and L" are neutral donor ligands. In some embodiments, L" may also be a phosphine having a formula PHR''⁵R''⁶. In such embodiments, the Group 8 metal complex may be represented by the formula (I):

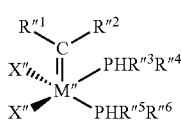

wherein
M" is a Group 8 metal (preferably M is ruthenium or osmium, preferably ruthenium);
each X" is independently an anionic ligand (preferably selected from the group consisting of halides, alkoxides, aryloxides, and alkyl sulfonates, preferably a halide, preferably chloride);
R"¹ and R"² are independently selected from the group consisting of hydrogen, a $C_1$ to $C_{30}$ hydrocarbyl, and a $C_1$ to $C_{30}$ substituted hydrocarbyl (preferably R"¹ and R"² are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and
R'''³, R'''⁴, R'''⁵, and R'''⁶ are independently selected from the group consisting of hydrogen, $C_1$ to $C_{12}$ hydrocarbyl groups, substituted $C_1$ to $C_{12}$ hydrocarbyl groups, and halides (preferably R'''³, R'''⁴, R'''⁵, and R'''⁶ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl).

With respect to embodiments where L" is a phosphine having a formula PHR'''⁵R'''⁶, in particular embodiments, at least one phosphine ligand is a secondary phosphine ligand. In such embodiments, where at least one of the neutral donor ligands is a secondary phosphine ligand, R'''³ and R'''⁴ or R'''⁵ and R'''⁶ are selected from the group consisting of $C_1$ to $C_{12}$ hydrocarbyl groups, substituted $C_1$ to $C_{12}$ hydrocarbyl groups, and halides. In particular embodiments, both donor ligands are secondary phosphine ligands and R'''³, R'''⁴, R'''⁵, and R'''⁶ are selected from the group consisting of $C_1$ to $C_{12}$ hydrocarbyl groups, substituted $C_1$ to $C_{12}$ hydrocarbyl groups, and halides.

With respect to embodiments where L" is a phosphine having a formula PHR'''⁵R'''⁶, in particular embodiments, at least one donor ligand is a primary phosphine ligand. In such embodiments where at least one of the phosphine ligands is a primary phosphine ligand, one of R'''³ and R'''⁴ or one of R'''⁵ and R'''⁶ is selected from the group consisting of $C_1$ to $C_{12}$ hydrocarbyl groups, substituted $C_1$ to $C_{12}$ hydrocarbyl groups, and halides. In particular embodiments, both donor ligands are primary phosphine ligands and one of R'''³ and R'''⁴ and one of R'''⁵ and R'''⁶ is selected from the group consisting of $C_1$ to $C_{12}$ hydrocarbyl groups, substituted $C_1$ to $C_{12}$ hydrocarbyl groups, and halides.

In some embodiments, R'''³ and R'''⁴ form a ring. With respect to embodiments where L" is a phosphine having a formula PHR'''⁵R'''⁶, in particular embodiments, R'''⁵ and R'''⁶ form a ring. In yet other embodiments, R'''³ and R'''⁴ form a ring and R'''⁵ and R'''⁶ form a ring. In other embodiments, R'''³ and at least one of R'''⁵ and R'''⁶ may form a ring, thereby forming a chelating phosphine ligand. In other embodiments, R'''⁴ and at least one of R'''⁵ and R'''⁶ may form a ring, thereby forming a chelating phosphine ligand.

In particular embodiments, the Group 8 metal complex is selected from:
[(HP(tert-butyl)$_2$)$_2$Ru(C$_5$H$_8$)Cl$_2$],
[(H$_2$P(tert-butyl))$_2$Ru(C$_5$H$_8$)Cl$_2$],
[(HP(cyclohexyl)$_2$)$_2$Ru(C$_5$H$_8$)Cl$_2$],
[(H$_2$P(cyclohexyl))$_2$Ru(C$_5$H$_8$)Cl$_2$],
[(HP(cyclopentyl)$_2$)$_2$Ru(C$_5$H$_8$)Cl$_2$],
[(H$_2$P(cyclopentyl))$_2$Ru(C$_5$H$_8$)Cl$_2$],
[(HP(n-butyl)$_2$)$_2$Ru(C$_5$H$_8$)Cl$_2$],
[(H$_2$P(n-butyl))$_2$Ru(C$_5$H$_8$)Cl$_2$],
[(HP(sec-butyl)$_2$)$_2$Ru(C$_5$H$_8$)Cl$_2$],
[(H$_2$P(sec-butyl))$_2$Ru(C$_5$H$_8$)Cl$_2$], and
fluoride and bromide derivatives thereof (preferably, wherein the Cl$_2$ in the above list is replaced with F$_2$, Br$_2$, ClF, ClBr or FBr).

In certain embodiments, the catalyst employed in the process of this invention may be bound to or deposited onto a solid support. In particular, the Group 8 metal complex may be bound to or deposited onto a solid support, which may simplify catalyst recovery. In addition, the support may increase catalyst strength and attrition resistance. Suitable catalyst supports include, without limitation, silicas; aluminas; silica-aluminas; aluminosilicates, including zeolites and other crystalline porous aluminosilicates; as well as titanias; zirconia; magnesium oxide; carbon; and cross-linked polymeric resins, such as functionalized cross-linked polystyrenes, e.g., chloromethyl-functionalized cross-linked polystyrenes; preferably silica or alumina The Group 8 metal complex may be deposited onto the support by any method known to those skilled in the art, including, for example, impregnation, ion-exchange, deposition-precipitation, and vapor deposition. Alternatively, a component of the catalyst, such as the Group 8 metal complex, may be chemically bound to the support via one or more covalent chemical bonds, for example, the catalyst may be immobilized by one or more covalent bonds with one or more of substituents of a ligand of the Group 8 metal complex. For example, the Group 8 metal complex may be deposited onto a silica support. Further, the Group 8 metal complex may be preloaded onto the solid support before forming the catalyst of the present invention. Alternatively, the supported catalyst may be generated in situ.

If a catalyst support is used, the catalyst compound may be loaded onto the catalyst support in any amount, provided that the metathesis process of this invention proceeds to the metathesis products. Generally, the catalyst compound is loaded onto the support in an amount based on the weight of the transition metal, preferably the Group 8 metal, preferably ruthenium or osmium, relative to the total weight of the catalysts plus support. The catalyst compound may be loaded onto the support in an amount greater than about 0.01 wt % of the Group 8 metal, based upon the weight of the catalysts plus support and preferably, greater than about 0.05 wt % of the Group 8 metal. Generally, the catalyst compound is loaded onto the support in an amount that is less than about 20 wt % of the Group 8 metal, and preferably less than about 10 wt % of the Group 8 metal.

In another embodiment, this invention relates to:

1. A polymer represented by the formula (A):

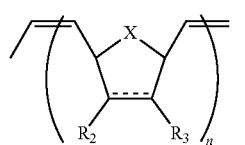
(A)

where $R_1$ is a hydrocarbyl group having greater than 25 carbon atoms (preferably greater than 30 carbon atoms, greater than 40 carbon atoms, or greater than 50 carbon atoms; preferably from 31 carbon atoms to 100,000 carbon atoms, from 40 carbon atoms to 75,000 carbon atoms, from 50 carbon atoms to 60,000 carbon atoms; preferably $R_1$ is represented by the formula (B):

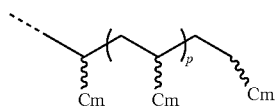
(B)

wherein Cm is a $C_4$ to $C_{40}$ olefin derived unit (preferably Cm is one or more units derived from butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 3 to 39 (preferably from 3 to 29, preferably from 4 to 19, preferably from 5 to 11); and p is an integer greater than 1 (preferably from 1 to 10,000, from 1 to 5,000, from 1 to 2,500, from 1 to 1,000, from 1 to 500, or from 1 to 50); preferably $R_1$ is represented by the formula (C):

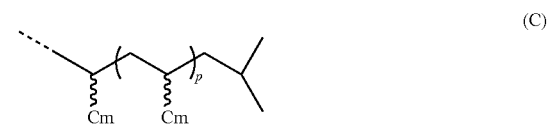
(C)

wherein Cm is a $C_3$ to $C_{40}$ olefin derived unit (preferably Cm is one or more derived units of propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 2 to 39 (preferably from 2 to 29, preferably from 3 to 19, preferably from 4 to 11); and p is an integer greater than 1 (preferably from 1 to 10,000, from 1 to 5,000, from 1 to 2,500, from 1 to 1,000, from 1 to 500, or from 1 to 50);

$R_2$ and $R_3$ are the same or different and each is hydrogen or a hydrocarbyl group having from 1 to 40 carbon atoms (preferably from 1 to 30, from 2 to 15, and from 2 to 12), or $R_2$ and $R_3$ are joined to form a five-membered or six-membered ring, or substituted analogs thereof (preferably $R_2$ and $R_3$ are joined to form a heteroatom containing ring; preferably $R_2$ and $R_3$ are joined to form a dicarboxylic anhydride);

X is C, N, or O (preferably X is C or O, preferably X is C);

n is an integer from 1 to 10,000 (preferably from 1 to 5,000, from 1 to 2,500, from 1 to 1,000, from 1 to 500, or from 1 to 50); and the dotted line indicates an optional double bond;

wherein the polymer comprises one or more vinyl terminated macromonomer derived units (preferably the vinyl terminated macromonomer is one or more of:

(i) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(ii) a copolymer having an Mn of 300 g/mol or more (measured by $^1$H NMR) comprising (a) from about 20 mol % to about 99.9 mol % of at least one $C_5$ to $C_{40}$ higher olefin, and (b) from about 0.1 mol % to about 80 mol % of propylene, wherein the higher olefin copolymer has at least 40% allyl chain ends;

(iii) a copolymer having an Mn of 300 g/mol or more (measured by $^1$H NMR) and comprises (a) from about 80 mol % to about 99.9 mol % of at least one $C_4$ olefin and (b) from about 0.1 mol % to about 20 mol % of propylene, wherein the vinyl terminated macromonomer has at least 40% allyl chain ends relative to total unsaturation;

(iv) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)−83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum;

(vi) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(vii) a propylene oligomer, comprising: at least 50 mol % propylene, from 0.1 mol % to 45 mol % ethylene, and from 0.1 to 5 mol % $C_4$ to $C_{12}$ olefin, wherein the oligomer has: at least 90% allyl chain ends, an Mn of about 150 to about 10,000 g/mol, and an isobutyl chain end to allylic vinyl group ratio of 0.8:1 to 1.35:1.0;

(viii) a propylene oligomer, comprising: at least 50 mol % propylene, from 0.1 to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0; and (ix) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum).

2. The polymer of paragraph 1, wherein the polymer is represented by the formula (D):

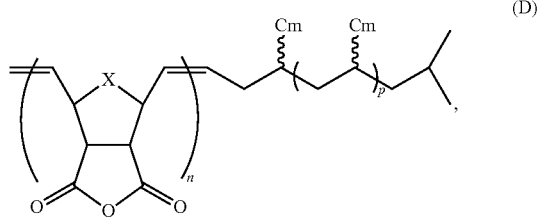

wherein n is an integer from 1 to 10,000 (preferably from 1 to 5,000, from 1 to 2,500, from 1 to 1,000, from 1 to 500, or from 1 to 50); Cm is a $C_3$ to $C_{40}$ olefin derived unit (preferably Cm is one or more derived units of propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 2 to 39 (preferably from 2 to 29, preferably from 3 to 19, preferably from 4 to 11); and p is an integer greater than 1 (preferably from 1 to 10,000, from 1 to 5,000, from 1 to 2,500, from 1 to 1,000, from 1 to 500, or from 1 to 50).

3. The polymer of paragraphs 1 and 2, wherein the polymer is hydrogenated.

4. The use of the polymer of paragraphs 1 to 3 as a lubricant or lubricant base stock, an adhesive, a viscosity modifier, or a fuel additive.

5. A process to produce the polymer of paragraphs 1 to 3, the process comprising contacting at least one cyclic olefin (preferably norbornene, norbornadiene, dicyclopentadiene, cyclopentene, cycloheptene, cyclooctene, cyclooctadiene, cyclododecene, 7-oxanorbornene, 7-oxanorbornadiene, and substituted derivatives therefrom; more preferably cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, cis-5-norbornene-endo-2,3-dicarboxylic anhydride, dimethyl norbornene carboxylate, norbornene-exo-2,3-carboxylic anhydride, and their respective homologs and derivatives) with at least one vinyl terminated macromonomer in the presence of one or more metathesis catalysts (preferably one or more of:

(i) an alkene metathesis catalyst represented by the Formula (E):

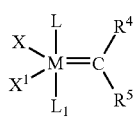

Formula (E)

where:

M is a Group 8 metal, preferably Ru or Os, preferably Ru;

X and $X^1$ are, independently, any anionic ligand, preferably a halogen (preferably chlorine), an alkoxide or a triflate, or X and $X^1$ may be joined to form a dianionic group and may form a single ring of up to 30 non-hydrogen atoms or a multinuclear ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear ring system of up to 30 non-hydrogen atoms;

L and X may be joined to form a multidentate monoanionic group and may form a single ring of up to 30 non-hydrogen atoms or a multinuclear ring system of up to 30 non-hydrogen atoms;

$L^1$ and $X^1$ may be joined to form a multidentate monoanionic group and may form a single ring of up to 30 non-hydrogen atoms or a multinuclear ring system of up to 30 non-hydrogen atoms;

$R^4$ and $R^5$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);

$R^5$ and $L^1$ or $X^1$ may be joined to form a single ring of up to 30 non-hydrogen atoms or a multinuclear ring system of up to 30 non-hydrogen atoms; and $R^4$ and L or X may be joined to form a single ring of up to 30 non-hydrogen atoms or a multinuclear ring system of up to 30 non-hydrogen atoms; and/or (ii) a metathesis catalyst represented by the Formula (F):

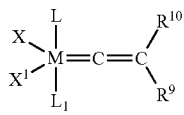

Formula (F)

where M is Os or Ru, preferably Ru;

X, $X^1$, L, and $L^1$ are as described above for Formula E; and $R^9$ and $R^{10}$ may be different or the same and may be hydrogen, substituted or unsubstituted alkyl, or substituted or unsubstituted aryl; and/or (iii) a metathesis catalyst represented by the formula (G):

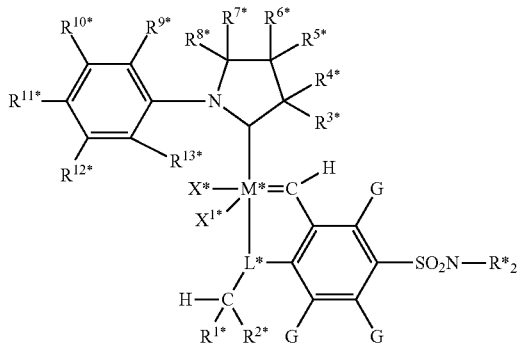

Formula (G)

where
M* is a Group 8 metal, preferably Ru or Os, preferably Ru;
X* and $X^{1*}$ are, independently, any anionic ligand, preferably a halogen (preferably chlorine), an alkoxide or an alkyl sulfonate, or X* and $X^{1*}$ may be joined to form a dianionic group and may form a single ring of up to 30 non-hydrogen atoms or a multinuclear ring system of up to 30 non-hydrogen atoms;
L* is N—R, O, P—R, or S, preferably N—R or O (R is a $C_1$ to $C_{30}$ hydrocarbyl or substituted hydrocarbyl, preferably methyl, ethyl, propyl or butyl);
R* is hydrogen or a $C_1$ to $C_{30}$ hydrocarbyl or substituted hydrocarbyl, preferably methyl;
$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;
each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;
$R^{10*}$, $R^{11*}$, $R^{12*}$ are, independently hydrogen or a $C_1$ to $C_{30}$ hydrocarbyl or substituted hydrocarbyl, preferably hydrogen or methyl;
each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); and
where any two adjacent R groups may form a single ring of up to 8 non-hydrogen atoms or a multinuclear ring system of up to 30 non-hydrogen atoms; and/or
(iv) a Group 8 metal complex represented by the formula (H):

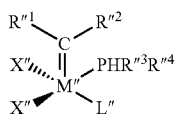

(H)

wherein
M'' is a Group 8 metal (preferably M is ruthenium or osmium, preferably ruthenium);
each X'' is independently an anionic ligand (preferably selected from the group consisting of halides, alkoxides, aryloxides, and alkyl sulfonates, preferably a halide, preferably chloride);
$R''^1$ and $R''^2$ are independently selected from the group consisting of hydrogen, a $C_1$ to $C_{30}$ hydrocarbyl, and a $C_1$ to $C_{30}$ substituted hydrocarbyl (preferably $R''^1$ and $R''^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);
$R''^3$ and $R''^4$ are independently selected from the group consisting of hydrogen, $C_1$ to $C_{12}$ hydrocarbyl groups, substituted $C_1$ to $C_{12}$ hydrocarbyl groups, and halides (preferably $R''^3$ and $R''^4$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and
L'' is a neutral donor ligand, preferably L'' is selected from the group consisting of a phosphine, a sulfonated phosphine, a phosphite, a phosphinite, a phosphonite, an arsine, a stibine, an ether, an amine, an imine, a sulfoxide, a carboxyl, a nitrosyl, a pyridine, a thioester, a cyclic carbene, and substituted analogs thereof; preferably a phosphine, a sulfonated phosphine, an N-heterocyclic carbene, a cyclic alkyl amino carbene, and substituted analogs thereof (preferably L'' is selected from a phosphine, an N-heterocyclic carbene, a cyclic alkyl amino carbene, and substituted analogs thereof); and/or
(v) a Group 8 metal complex represented by the formula (I):

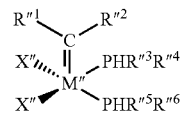

(I)

wherein
M'' is a Group 8 metal (preferably M is ruthenium or osmium, preferably ruthenium);
each X'' is independently an anionic ligand (preferably selected from the group consisting of halides, alkoxides, aryloxides, and alkyl sulfonates, preferably a halide, preferably chloride);
$R'''^1$ and $R'''^2$ are independently selected from the group consisting of hydrogen, a $C_1$ to $C_{30}$ hydrocarbyl, and a $C_1$ to $C_{30}$ substituted hydrocarbyl (preferably $R'''^1$ and $R'''^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and
$R'''^3$, $R'''^4$, $R'''^5$, and $R'''^6$ are independently selected from the group consisting of hydrogen, $C_1$ to $C_{12}$ hydrocarbyl groups, substituted $C_1$ to $C_{12}$ hydrocarbyl groups, and halides (preferably $R'''^3$, $R'''^4$, $R'''^5$, and $R'''^6$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);
at a temperature of 20° C. to 200° C. (preferably 50° C. to 160° C., preferably 60° C. to 140° C.) and a pressure of 0 MPa to 1000 MPa (preferably 0.5 MPa to 500 MPa, preferably 1

MPa to 250 MPa) for a residence time of 0.5 seconds to 10 hours (preferably 1 second to 5 hours, preferably 1 minute to 1 hour).

6. The process of paragraph 5, wherein the metathesis catalyst is one or more of:

tricyclohexylphosphine[1,3-bis(2,4,6-trimethylphenyl)imidazol-2-ylidene][3-phenyl-1H-inden-1-ylidene]ruthenium(II)dichloride,
tricyclohexylphosphine[3-phenyl-1H-inden-1-ylidene][1,3-bis(2,4,6-trimethylphenyl)-4,5-dihydro-imidazol-2-ylidene]ruthenium(II)dichloride,
tricyclohexylphosphine[1,3-bis(2,4,6-trimethylphenyl)-4,5-dihydroimidazol-2-ylidene][(phenylthio)methylene]ruthenium(II)dichloride,
bis(tricyclohexylphosphine)-3-phenyl-1H-inden-1-ylideneruthenium(II)dichloride,
1,3-bis(2,4,6-trimethylphenyl)-4,5-dihydroimidazol-2-ylidene[2-(i-propoxy)-5-(N,N-dimethylaminosulfonyl)phenyl]methyleneruthenium(II)dichloride,
[1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride,
benzylidene-bis(tricyclohexylphosphine)dichlororuthenium,
benzylidene[1,3-bis(2,4,6-trimethylphenyl)-2-imidazolidinylidene]dichloro(tricyclohexylphosphine)ruthenium,
dichloro(o-isopropoxyphenylmethylene)(tricyclohexylphosphine)ruthenium(II),
(1,3-bis-(2,4,6-trimethylphenyl)-2-imidazolidinylidene)dichloro(o-isopropoxyphenylmethylene)ruthenium,
1,3-bis(2-methylphenyl)-2-imidazolidinylidene]dichloro(2-isopropoxyphenylmethylene) ruthenium(II),
[1,3-bis(2,4,6-trimethylphenyl)-2-imidazolidinylidene]dichloro[3-(2-pyridinyl)propylidene]ruthenium(II),
[1,3-bis(2-methylphenyl)-2-imidazolidinylidene]dichloro(phenylmethylene) (tricyclohexylphosphine)ruthenium (II),
[1,3-bis(2,4,6-trimethylphenyl)-2-imidazolidinylidene]dichloro(3-methyl-2-butenylidene) (tricyclohexylphosphine)ruthenium(II),
[1,3-bis(2,4,6-trimethylphenyl)-2-imidazolidinylidene]dichloro(benzylidene)bis(3-bromopyridine)ruthenium (II),
2-(2,6-diethylphenyl)-3,5,5,5-tetramethylpyrrolidine[2-(i-propoxy)-5-(N,N-dimethylaminosulfonyl)phenyl]methylene ruthenium dichloride,
2-(mesityl)-3,3,5,5-tetramethylpyrrolidine[2-(i-propoxy)-5-(N,N-dimethylaminosulfonyl)phenyl]methylene ruthenium dichloride,
2-(2-isopropyl)-3,3,5,5-tetramethylpyrrolidine[2-(i-propoxy)-5-(N,N-dimethylaminosulfonyl)phenyl]methylene ruthenium dichloride,
2-(2,6-diethyl-4-fluorophenyl)-3,3,5,5-tetramethylpyrrolidine[2-(i-propoxy)-5-(N,N-dimethylaminosulfonyl)phenyl]methylene ruthenium dichloride,
[(HP(tert-butyl)$_2$)$_2$Ru(C$_5$H$_8$)Cl$_2$],
[(H$_2$P(tert-butyl))$_2$Ru(C$_5$H$_8$)Cl$_2$],
[(HP(cyclohexyl)$_2$)$_2$Ru(C$_5$H$_8$)Cl$_2$],
[(H$_2$P(cyclohexyl))$_2$Ru(C$_5$H$_8$)Cl$_2$],
[(HP(cyclopentyl)$_2$)$_2$Ru(C$_5$H$_8$)Cl$_2$],
[(H$_2$P(cyclopentyl))$_2$Ru(C$_5$H$_8$)Cl$_2$],
[(HP(n-butyl)$_2$)$_2$Ru(C$_5$H$_8$)Cl$_2$],
[(H$_2$P(n-butyl))$_2$Ru(C$_5$H$_8$)Cl$_2$],
[(HP(sec-butyl)$_2$)$_2$Ru(C$_5$H$_8$)Cl$_2$],
[(H$_2$P(sec-butyl))$_2$Ru(C$_5$H$_8$)Cl$_2$], and
fluoride and bromide derivatives thereof 7. The process of paragraphs 5 and 6, wherein substantially no dimerization occurs.

EXAMPLES

Tests and Materials

The following abbreviations are used in the Examples: h is hours, min is minutes, Me is methyl, and Bu is butyl.

Gas Chromatography

Gas Chromatography was performed on an Agilent 6890 with a J&W scientific DB-1 column (1=60 m, ID=0.25 mm, film thickness=1 μm) using Chemstation software (Rev.B.02.01-SR1).

$^1$H NMR

All $^1$H NMR data was collected on a Bruker AVANCE III 400 MHz spectrometer running Topspin™ 3.0 software at room temperature (approx 23° C.). Tetrachloroethane-d$_2$ was used as a solvent (chemical shift of 5.98 ppm was used as a reference) for all materials.

Molar Ratio of Products

The molar ratio of products was calculated based on the ratios of the $^1$H-NMR integration of CH$_2$ olefin in the functionalized polymer (5.1 ppm-5.3 ppm) and the polymer starting material (4.9 ppm-5.0 ppm), plus the CH=CH olefin of the norbornene anhydride starting material (6.3 ppm).

Degree of ROCM

Method A

The degree of ROCM, or number of norbornene anhydride units on the end of the functionalized copolymer was calculated by the ratio of the $^1$H-NMR integration of total internal olefin (5.3 ppm-5.7 ppm) to the CH$_2$ olefin in the functionalized polymer (5.1 ppm-5.3 ppm):

$$\text{Degree of } ROCM \text{ (method } A) = \frac{\int \text{intolefin}}{\int = CH_2(\text{product})}.$$

Method B

Alternatively, the degree of ROCM can be calculated by the ratio of the $^1$H-NMR integration of product ring methine protons (2.75 ppm-3.5 ppm) to the CH$_2$ olefin in the functionalized polymer (5.1 ppm-5.3 ppm).

$$\text{Degree of } ROCM \text{ (method } B) = \frac{\int \text{methine}}{\int = CH_2(\text{product})} * \frac{1}{2}.$$

Comparison of Methods A and B

Both dimer (assuming two vinyl terminated starting material molecules (VTM) are coupled by the metathesis catalysts) and product comprise unresolved internal olefins. As a result, method A is not accurate for a sample that contains VTM dimers. Although there is no direct method for measuring the amount of VTM dimer, both methods assume a negligible amount of product dimerization. Therefore, a comparison of these two methods can help estimate relative amounts of VTM dimer in the mixture. For example, where the degree of ROMP obtained by Methods A and B are similar or the same, there is assumed to be little or no dimerization. Conversely, where the degree of ROCM obtained by Methods A and B are different, there is assumed to be appreciable dimerization. For the purpose of the claims, appreciable dimerization occurs where there is greater than 25% difference between the degree of ROCM obtained using Method A as compared to that obtained using Method B.

Turn Over Number (TON)

This measure of catalyst activity is determined from the molar ratio of VTM to catalyst multiplied by the VTM conversion and the degree of ROCM:

$$Conversion_{VTM} * ROCM \frac{m_{VTM}}{m_{catalyst}}.$$

General

All reactions were performed under an inert nitrogen atmosphere. Solvents were anhydrous grade from Sigma Aldrich which were sparged with nitrogen and stored over alumina beads (activated at 300° C.) before use. Deuterated solvents were obtained from Cambridge Isotope Laboratories (Andover, Mass.) and dried over 3 Å molecular sieves. All other reagents were obtained from Sigma Aldrich (St. Louis, Mo.) and used as received, unless otherwise noted. Silica gel was obtained from Grace Davidson as Grade 948, and was used as received.

Metathesis Catalysts $((t-Bu)_2PH)_2Cl_2Ru=CHCH=C(CH_3)_2$ was prepared as described in U.S. Ser. No. 13/149,012. 2-(2,6-diethylphenyl)-3,3,5,5-tetramethylpyrrolidine[2-(i-propoxy)-5-(N,N-dimethylaminosulfonyl)phenyl]methylene ruthenium dichloride was prepared as disclosed in U.S. Pat. No. 8,063,232.

Vinyl Terminated Macromonomers

Vinyl Terminated Hexene Propylene Copolymer

A 2 L autoclave was filled with 600 mls isohexanes, 0.5 ml 1.0 M triisobutyl aluminum (in hexanes), 200 mls propylene, 100 mls hexene and the contents heated to 70° C. A catalyst solution was made by reacting 10.7 mg of Metallocene E (structure below; synthesis of Metallocene E is disclosed in U.S. Ser. No. 13/072,288), with 24.1 mg of dimethylanilinium tetrakis(perfluoronaphthyl)borate in 10 ml toluene. This solution (3.3 mls) was injected into the autoclave under high $N_2$ pressure. The reaction proceeded for 30 minutes. The autoclave was then cooled to room temperature, depressurized and the contents transferred to a beaker. Volatiles were removed and the product dried in vacuo at 70° C. for 4 hrs. Yield was 126 g. The copolymer had 97% vinyls, 3% vinylidenes, and Mn of 1600 g/mol by $^1$H NMR.

E

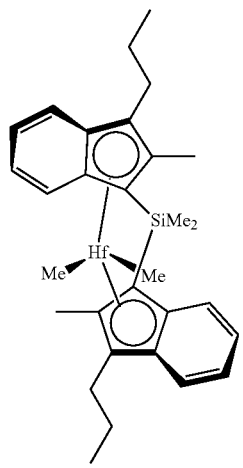

Vinyl Terminated Butene Propylene Copolymer

Continuous solution polymerization was carried out using Metallocene E as the catalyst, and dimethylaniliniumtetrakis (perfluoronaphthyl)borate as the activator. Metallocene E was premixed with dimethylaniliniumtetrakis(perfluoronaphthyl)borate in a 1:1 ratio and fed into the reactor at a rate of $3.3 \times 10^{-7}$ moles/minute. Propylene ($C_3$) was fed into the reactor at a rate of 15 g/minute, isohexane at a feed rate of 59.4 g/minute, butene ($C_{4=}$) at a feed rated of 8.0 g/minute, and tri-n-octyl aluminum at a feed rate of $5.2 \times 10^{-6}$ moles/minute. 243 grams of polymer, 26.6 mol % conversion, was obtained at 80° C. with a run time of 40 minutes. Catalyst activity: 18,400 kgP/molcat. The copolymer had 92.4% vinyls, 4.4% vinylidenes, and Mn of 1726 g/mol by $^1$H NMR.

Example 1

Synthesis of the ROCM Reaction Product of Norbornene Dicarboxylic Anhydride with Vinyl Terminated Hexene Propylene Copolymer The vinyl terminated hexene propylene copolymer (1.0 g, described above) was placed in a 20 ml scintillation vial with 5 mls of tetrachloroethane-$d_2$. Cis-5-norbornene-endo-2,3-dicarboxylic anhydride (0.10 g, Sigma Aldrich, St. Louis, Mo.) was added to the mixture. The solubility of the carboxylic anhydride was noted visually as minimal A 3.0 mg amount of $((t-Bu)_2PH)_2Cl_2Ru=CHCH=C(CH_3)_2$ was added to the reaction mixture and the slurry was heated to 50° C. for three hours. During that time, the insoluble particulates of the carboxylic anhydride were observed to solubilize, thereby providing evidence for the ring opening cross metathesis reaction. The reaction was further diluted into 10 mls of dichloromethane, filtered through 1.0 grams of silica, and dried under vacuum. The product was characterized by $^1$H NMR: (400 MHz, $C_2D_4Cl_2$), δ 5.9 (m), 5.7-5.3 (m), 5.2 (m) 3.5-3.35 (m), 3.25 (br), 3.0 (br), 2.0 (br), 1.57 (br), 1.42 (br), 1.26 (br), 1.02 (br), 0.90 (br), 0.80 (br).

Example 2

Synthesis of the ROCM Reaction Product of Dimethyl Norbornene Dicarboxylate with Vinyl Terminated Hexene Propylene Copolymer The vinyl terminated hexene propylene copolymer (1.4 g, as described above) was placed in a 20 ml scintillation vial with 5 mls of tetrachloroethane-$d_2$. Dimethyl norbornene dicarboxylate (0.14 g, Sigma Aldrich) was added to the mixture. A 3.0 mg amount of $((t-Bu)_2PH)_2Cl_2Ru=CHCH=C(CH_3)_2$ was added to the reaction mixture and the slurry was heated to 50° C. for three hours. The reaction was further diluted into 10 mls of dichloromethane, filtered through 1.0 grams of silica and dried under vacuum. The product was characterized by $^1$H NMR: (400 MHz, $C_2D_4Cl_2$), δ 5.9 (m), 5.4 (br), 5.2 (m) 3.6 (br), 3.1 (br), 3.0 (br), 1.9 (br), 1.57 (br), 1.42 (br), 1.26 (br), 1.02 (br), 0.90 (br), 0.80 (br).

Example 3

Synthesis of the ROCM Reaction Product of Norbornene Dicarboxylic Anhydride with Vinyl Terminated Hexene Propylene Copolymer

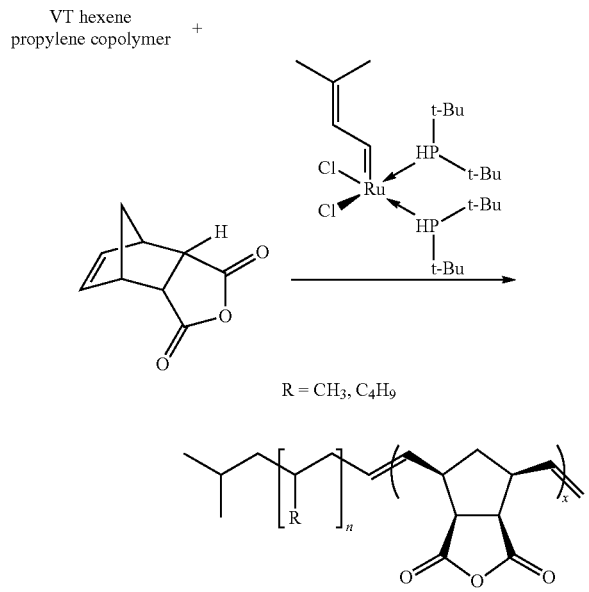

An oven dried 100 mL round bottom flask was charged with the vinyl terminated hexene-propylene copolymer (VT hexene propylene copolymer) as described in Example 1 (15.2 g, ~9 mmol), cis-5-norbornene-endo-2,3-dicarboxylic anhydride (2.1 g, 12.8 mmol) and CHCl$_3$ (15 mL). The suspension was then stirred and heated to 50° C. and the ((t-Bu)$_2$PH)$_2$Cl$_2$Ru=CHCH=C(CH$_3$)$_2$ was added in one portion. After 5 hours a large portion of the insoluble material had dissolved, indicating progression of the ROCM reaction. The reaction was allowed to stir overnight at room temperature. The reaction was observed to still be a suspension on the following morning. The reaction was then diluted with methylene chloride and filtered through a plug of silica.

After filtration and concentration, there remained 15.9 g of a lightly colored oil. This material was treated with pentane (~150 mL) and cooled to −30° C. overnight. The solid material (unreacted anhydride) had settled to the bottom of the flask overnight and the oil-pentane solution was decanted carefully. The solution was concentrated in vacuo, yielding a light yellow oil. The product oil was characterized using $^1$H-NMR: 400 MHz (C$_2$D$_2$Cl$_4$): δ 5.9 (m, 0.45H), 5.3-5.7 (m, 1.05H), 5.1-5.3 (m, 0.86H), 5.0 (m, 0.15), 3.35-3.55 (m, 0.98H), 3.2-3.35 (m, 0.21H), 2.9-3.1 (m, 0.77H), 0.5-2.5 (m, 160H).

$^1$H-NMR analysis indicated that the product oil consisted of a molar ratio of 83% anhydride functionalized hexene propylene copolymer product, 14% hexene-propylene copolymer starting material, and 3% anhydride starting material. The degree of ROCM, or number of norbornene anhydride units on the end of the functionalized copolymer was calculated to be 1.2 using both methods A and B. Catalyst TON was calculated to be 722.

Example 4

Synthesis of the ROCM Reaction Product of norbornene-exo-2,3 dicarboxylic anhydride with Vinyl Terminated Hexene Propylene Copolymer

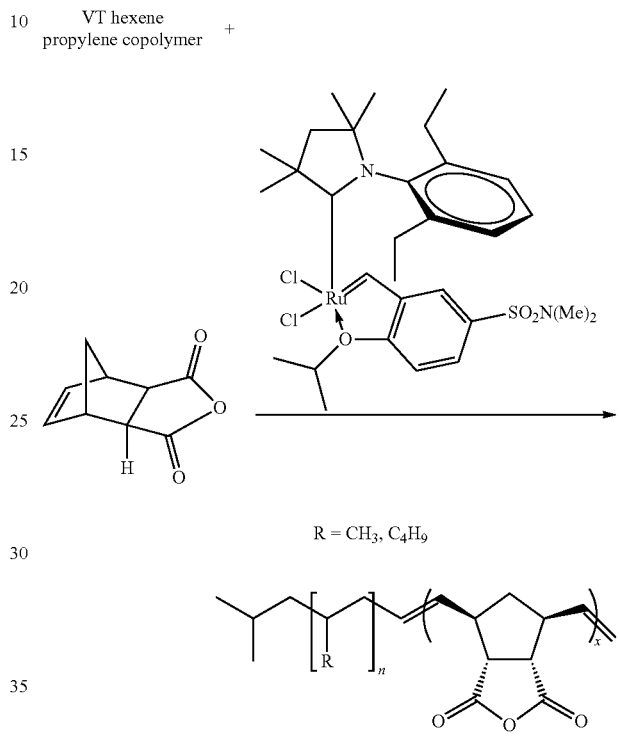

An oven dried 100 mL round bottom flask was charged in the drybox with the hexene-propylene vinyl terminated copolymer described in Example 1 (13.6 g, ~8 mmol), norbornene-exo-2,3 dicarboxylic anhydride (1.5 g, 9.1 mmol) and CHCl$_3$ (15 mL). The solution was heated to 50° C. and 2-(2,6-diethylphenyl)-3,3,5,5-tetramethylpyrrolidine[2-(1-propoxy)-5-(N,N-dimethylaminosulfonyl)phenyl]methylene ruthenium dichloride catalyst (6.3 mg, 0.01 mmol) was added in one portion. The reaction was allowed to stir for 6 hours after which the reaction was diluted with pentane (20 mL) and filtered through a plug of silica. The silica plug was then washed with pentane (3×30 mL) and the combined filtrate was concentrated in vacuo at 50° C. Concentration overnight yielded 6.6 g of a thick yellow polymer (the majority of the polymer was likely retained on the silica plug). The polymer product was analyzed by $^1$H-NMR: 400 MHz (C$_2$D$_2$Cl$_4$): δ 5.9 (m, 0.08H), 5.3-5.7 (m, 0.89H), 5.1-5.3 (m, 0.17H) 5.0 (m, 0.08), 3.1-3.4 (m, 0.91H), 2.75-3.0 (m, 0.53H), 0.5-2.5 (m, 97.2H).

$^1$H-NMR analysis indicated a molar ratio of 68% functionalized hexene-propylene copolymer product and 32% hexene-propylene copolymer starting material. The degree of ROCM calculated using method A was 5.23 and method B was 4.23, the difference most likely indicating a significant amount of dimerization. Catalyst TON was calculated to be 2499.

Example 5

Synthesis of the ROCM Reaction Product of norbornene-exo-2,3 dicarboxylic anhydride with Vinyl Terminated Hexene Propylene Copolymer

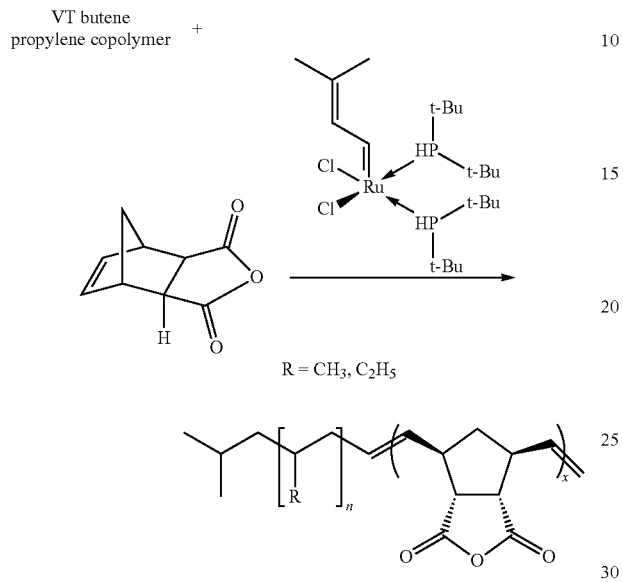

An oven dried 250 mL round bottom flask was charged in the drybox with the vinyl terminated butene-propylene copolymer (VT butene propylene copolymer described above, 47.0 g, ~27.2 mmol), norbornene-exo-2,3 dicarboxylic anhydride (7.7 g, 46.9 mmol) and CHCl$_3$ (50 mL). The solution was heated to 50° C. and stirred for two hours to homogenize the poorly soluble anhydride. The solution was analyzed by $^1$H-NMR showing a molar ratio of approximately 2 norbornene anhydride to one vinyl terminated butene-propylene copolymer vinyl group. The catalyst, ((t-Bu)$_2$PH)$_2$Cl$_2$Ru=CHCH=C(CH$_3$)$_2$, was added in one portion and stirred at 50° C. for 2 hours. The reaction was quenched using 1 g silica, and the CHCl$_3$ was removed under vacuum at 45° C. overnight. The translucent brown polymer was treated with approximately 150 mL of pentane. The mixture was heated to 40° C. and stirred for several hours to homogenize the mixture. The mixture was then cooled for 2 hours to −25° C. This mixture was then filtered using a plug of silica, followed by further filtration through 1 micron syringe filters. The solvent was removed under a stream of nitrogen gas. The polymer was further dried by sparging nitrogen gas directly into the polymer while heating it to 80° C. The dried polymer was analyzed by $^1$H-NMR: 400 MHz (C$_2$D$_2$Cl$_4$): δ 5.9 (m, 0.32H), 5.3-5.7 (m, 1.35H), 5.1-5.3 (m, 0.57H), 2.75-3.5 (m, 2.51H), 0.5-2.5 (m, 93.9H).

$^1$H-NMR showed 100% conversion of the vinyl terminated butene-propylene copolymer starting material. The degree of ROCM was calculated to be 2.4 using method A and 2.2 using method B. According, little or no dimerization occurred. Catalyst TON was calculated to be 1,820.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A polymer represented by the formula (A):

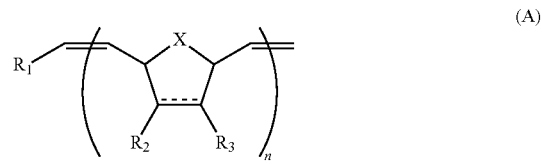

where $R_1$ is a hydrocarbyl group having greater than 25 carbon atoms;
$R_2$ and $R_3$ are the same or different and each is hydrogen or a hydrocarbyl group having from 1 to 40 carbon atoms, or $R_2$ and $R_3$ are joined to form a five-membered or six-membered ring, or substituted analogs thereof;
X is C, N, or 0;
n is an integer from 1 to 10,000; and
the dotted line indicates an optional double bond;
wherein the polymer comprises one or more vinyl terminated macromonomer derived units;
wherein $R_1$ is represented by the formula (B):

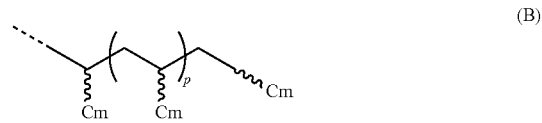

wherein "C" is one or more derived units of butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, m is an integer from 2 to 39, and p is an integer greater than or equal to 1.

2. The polymer of claim 1, wherein the vinyl terminated macromonomer is one or more of:
(i) a vinyl terminated polymer having an Mn of at least 200 g/mol (measured by $^1$H NMR) comprising of one or more C$_4$ to C$_{40}$ higher olefin derived units, where the higher olefin polymer comprises substantially no propylene derived units, and wherein the higher olefin polymer has at least 5% allyl chain ends;
(ii) a copolymer having an Mn of 300 g/mol or more (measured by $^1$H NMR) comprising (a) from about 20 mol % to about 99.9 mol % of at least one C$_5$ to C$_{40}$ higher olefin and (b) from about 0.1 mol % to about 80 mol % of propylene, wherein the higher olefin copolymer has at least 40% allyl chain ends;

(iii) a copolymer having an Mn of 300 g/mol or more (measured by $^1$H NMR) and comprises (a) from about 80 mol % to about 99.9 mol % of at least one $C_4$ olefin and (b) from about 0.1 mol % to about 20 mol % of propylene, wherein the vinyl terminated macromonomer has at least 40% allyl chain ends relative to total unsaturation;

(iv) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer; 2) X=45, when greater than 60 mol % and less than 70 mol % ethylene is present in the co-oligomer; and 3) X=(1.83*(mol % ethylene incorporated) −83), when 70 mol % to 90 mol % ethylene is present in the co-oligomer;

(v) a propylene oligomer, comprising more than 90 mol % propylene and less than 10 mol % ethylene wherein the oligomer has: at least 93% allyl chain ends, a number average molecular weight (Mn) of about 500 g/mol to about 20,000 g/mol, an isobutyl chain end to allylic vinyl group ratio of 0.8:1 to 1.35:1.0, and less than 100 ppm aluminum;

(i) a propylene oligomer, comprising: at least 50 mol % propylene and from 10 mol % to 50 mol % ethylene, wherein the oligomer has: at least 90% allyl chain ends, an Mn of about 150 g/mol to about 10,000 g/mol, and an isobutyl chain end to allylic vinyl group ratio of 0.8:1 to 1.2:1.0, wherein monomers having four or more carbon atoms are present at from 0 mol % to 3 mol %;

(ii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of about 150 g/mol to about 10,000 g/mol, and an isobutyl chain end to allylic vinyl group ratio of 0.8:1 to 1.35:1.0;

(iii) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of about 150 g/mol to about 10,000 g/mol, and an isobutyl chain end to allylic vinyl group ratio of 0.7:1 to 1.35:1.0; and (ix) a homo-oligomer, comprising propylene, wherein the oligomer has: at least 93% allyl chain ends, an Mn of about 500 g/mol to about 20,000 g/mol, an isobutyl chain end to allylic vinyl group ratio of 0.8:1 to 1.2:1.0, and less than 1400 ppm aluminum.

3. The polymer of claim 1, wherein p is an integer from 1 to 10,000.

4. A polymer represented by the formula (A):

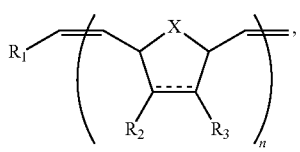

(A)

where R1 is a hydrocarbyl group having greater than 25 carbon atoms;

R2 and R3 are the same or different and each is hydrogen or a hydrocarbyl group having from 1 to 40 carbon atoms, or R2 and R3 are joined to form a five-membered or six-membered ring, or substituted analogs thereof;

X is C, N, or O;

n is an integer from 1 to 10,000;

and the dotted line indicates an optional double bond;

wherein the polymer comprises one or more vinyl terminated macromonomer derived units; wherein $R_1$ is represented by the formula (C):

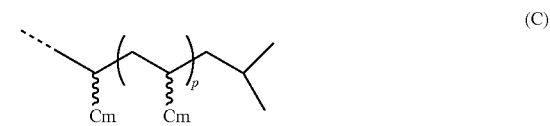

(C)

wherein "C" is a $C_3$ to $C_{40}$ olefin derived unit, m is an integer from 2 to 39, and p is an integer greater than 1.

5. The polymer of claim 4, wherein "C" is one or more derived units of propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof.

6. The polymer of claim 4, wherein p is an integer from 1 to 10,000.

7. The polymer of claim 1, wherein each of $R_2$ and $R_3$ is hydrogen or a $C_1$ to $C_{20}$ hydrocarbyl group.

8. The polymer of claim 1, wherein $R_2$ and $R_3$ form a heteroatom-containing ring.

9. The polymer of claim 4, wherein the polymer is represented by the formula (D):

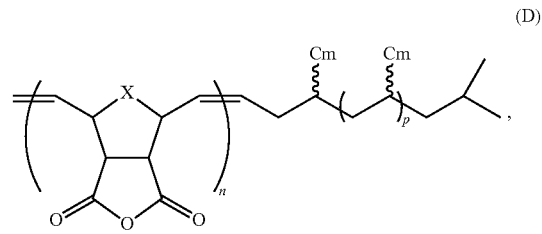

(D)

wherein n is an integer from 1 to 10,000, m is an integer from 3 to 39, and p is an integer greater than 1.

10. The polymer of claim 1, wherein n is an integer from 1 to 50.

11. The polymer of claim 1, wherein the polymer has been hydrogenated.

12. A composition comprising the polymer of claim 1.

13. The composition of claim 12, wherein the composition is a lubricant or lubricant base stock, an adhesive, a viscosity modifier, or a fuel additive.

* * * * *